US008606551B2

(12) United States Patent (10) Patent No.: US 8,606,551 B2
Noureldin et al. (45) Date of Patent: Dec. 10, 2013

(54) SYSTEM, PROGRAM PRODUCT, AND RELATED METHODS FOR GLOBAL TARGETING OF PROCESS UTILITIES UNDER VARYING CONDITIONS

(75) Inventors: Mahmoud Bahy Noureldin, Dhahran (SA); Ahmed Saleh Aseeri, Damman (SA); Yacoub Y. Al-Abdullah, Damman (SA)

(73) Assignee: Saudi Arabian Oil Company, Dhahran (SA)

( * ) Notice: Subject to any disclaimer, the term of this patent is extended or adjusted under 35 U.S.C. 154(b) by 970 days.

(21) Appl. No.: 12/480,415

(22) Filed: Jun. 8, 2009

(65) Prior Publication Data

US 2010/0030547 A1 Feb. 4, 2010

Related U.S. Application Data

(60) Provisional application No. 61/171,030, filed on Apr. 20, 2009, provisional application No. 61/172,698, filed on Apr. 24, 2009, provisional application No. 61/207,874, filed on Jun. 6, 2008.

(51) Int. Cl.
*G06F 7/60* (2006.01)
*G06F 17/10* (2006.01)
*G06G 7/48* (2006.01)

(52) U.S. Cl.
USPC .................................................. 703/2; 703/6

(58) Field of Classification Search
USPC .................................................. 703/2, 6, 10
See application file for complete search history.

(56) References Cited

U.S. PATENT DOCUMENTS

| 5,886,895 | A | * | 3/1999 | Kita et al. | 700/28 |
| 7,729,809 | B2 | * | 6/2010 | Noureldin | 700/291 |
| 2008/0257413 | A1 | | 10/2008 | Noureldin et al. | |

FOREIGN PATENT DOCUMENTS

| NZ | 52724 | 7/2003 |
| WO | W00108054 | 1/2001 |
| WO | WO 2005/010783 A1 | 2/2005 |
| WO | WO 2005010783 | 3/2005 |
| WO | WO 2007/149582 A2 | 12/2007 |

OTHER PUBLICATIONS

PCT International Search Report and Written Opinion, European Patent Office, International Application No. PCT/US2009/046595, Sep. 7, 2011.

(Continued)

*Primary Examiner* — Aniss Chad
(74) *Attorney, Agent, or Firm* — Bracewell & Giuliani LLP; Constance Rhebergen

(57) ABSTRACT

Systems, program product, and methods to optimize energy management for a site including a combined steam heat and electrical power system, is provided. A system, for example, can include a computer including memory, and energy utility modeling program product stored in the memory. The system can rigorously target, without manual iteration, for multiple utility commodity targets to include their global minimum and maximum requirements or capabilities, individually, or subject to other target objectives, due to varying process conditions. The system can also obtain the supply and demand best and worst case scenarios due to varying process conditions for a given process or cluster of processes. The system can also provide such data subject to other supply and demand objectives, and can further provide a range of commodity requirements or capabilities subject to user selected values for other commodity requirements or capabilities.

50 Claims, 25 Drawing Sheets

(56) References Cited

OTHER PUBLICATIONS

Serna, Medardo et al., "An Area Targeting Algorithm for the Synthesis of Heat Exchanger Networks," Chemical Engineering Science, Oxford, GB, vol. 59, No. 12, Jun. 1, 2004, pp. 2517-2520, XP004508227.

Lagaros, Nikos D. et al., "Multi-Objective Design Optimization Using Cascade Evolutionary Computations," Computer Methods in Applied Mechanics and Engineering, North Holland, Amsterdam, NL, vol. 194, No. 30-33, Aug. 12, 2005, pp. 3496-3515, XP004921676.

DHole, V.R., "Total Site Targets for Fuel, Co-Generation, Emissions, and Cooling" (1992).

Mavromatis, S.P., "Conceptual Optimisation of Utility Networks for Operational Variations—1. Targets and Level Optimisation," (Jan. 1997).

Mohan, T.,"AI Algebraic Targeting Approach for Effective Utilization of Biomass in Combined Heat and Power Systems Through Process Integration," (Jun. 15, 2006).

Pretty, B., "A Road Map for Long Term Energy Savings," 2001 Chem Show, (Oct. 23-25, 2001).

Serna, et al., An Area Targeting Algorithm for the Synthesis of Heat Exchanger Networks, Chemical Engineering Science 59 (2004) 2517-2520.

Press, W.H., et al.; Chapter 10. Maximization of Maximization of Functions, Numerical Recipes in Pascal. Art of Scientific Computing, Cambridge, Cambridge Univ. Press, G. Jan. 1, 1989, pp. 274-334, XP-002122410.

DeRuyck, et al., Broadening the Capabilities of a Pinch Analysis Through Virtual Heat Exchanger Networks, Energy Conversion & Management 44 (2003) 2321-2329.

Ravagnani, et al., Heat Exchanger Network Synthesis and Optimisation Using Genetic Algorithm, Applied Thermal Engineering 25 (2005) 1003-1017.

Lagaros, et al., Multi-objective Design Optimization Using Cascade Evolutionary Computations, Comput. Methods Appl. Mech. Engrg. 194 (2005) 3496-3515.

Petchers, N., An Integrated Approach to Energy Resource Optimization, Chapter 8, Combined Heating, Cooling & Power Handbook; Technologies & Applications (2003).

\* cited by examiner

FIG.3.

| HEADER | PRESSURE | TEMPERATURE | SPECIFIC ENTHALPY | PROCESS #1 | | PROCESS #2 | | ...PROCESS #M | |
|---|---|---|---|---|---|---|---|---|---|
| | | | | STEAM SUPPLY/ GENERATION | STEAM DEMAND | STEAM SUPPLY/ GENERATION | STEAM DEMAND | STEAM SUPPLY/ GENERATION | STEAM DEMAND |
| 1 | 160 | 600 | 1327 | [1:2] | [4:6] | [0:1] | [8:9] | [ : ] | [ : ] |
| 2 | 80 | 395 | 1227 | [2:3] | [5:7] | [2:4] | [7:8] | [ : ] | [ : ] |
| 3 | 60 | 300 | 1181 | [7:10] | [0:0] | [5:5] | [0:0] | [ : ] | [ : ] |

FIG.14.

| HEADER | PRESSURE | TEMPERATURE | SPECIFIC ENTHALPY | PROCESS #1 | | PROCESS #2 | | ... | PROCESS # M | |
|---|---|---|---|---|---|---|---|---|---|---|
| | | | | STEAM SUPPLY/ GENERATION | STEAM DEMAND | STEAM SUPPLY/ GENERATION | STEAM DEMAND | | STEAM SUPPLY/ GENERATION | STEAM DEMAND |
| 1 | 160 | 600 | 1327 | [2:2] | [0:0] | [0:0] | [4:4] | | [ː] | [ː] |
| 2 | 80 | 395 | 1227 | [2:3] | [2:2] | [1:2] | [2:2] | | [ː] | [ː] |
| 3 | 60 | 300 | 1181 | [0:0] | [1:2] | [5:5] | [0:2] | | [ː] | [ː] |

SYSTEM, PROGRAM PRODUCT, AND RELATED METHODS FOR GLOBAL TARGETING OF PROCESS UTILITIES UNDER VARYING CONDITIONS

CROSS-REFERENCE TO RELATED APPLICATIONS

This non-provisional application claims priority to and the benefit of U.S. Patent Application No. 61/171,030, filed Apr. 20, 2009, titled "System, Program Product, and Related Methods for Global Targeting of Process Utilities Under Varying Conditions," U.S. Patent Application No. 61/172,698, filed Apr. 24, 2009, titled "System Program Product, and Related Methods for Global Targeting of Process Utilities Under Varying Conditions," and U.S. Patent Application No. 61/207,874, filed Jun. 6, 2008, titled "System, Program Product, and Related Methods for Global Targeting of Process Utilities Under Varying Conditions," each incorporated herein by reference in their entirety.

BACKGROUND OF THE INVENTION

1. Field of the Invention

The present invention relates to the field of energy targeting systems, program product, and related methods.

2. Description of the Related Art

The simultaneous optimization of design and operation in process and utilities facilities is a very challenging task, due to, for example, varying supply and demand. It is often necessary to tailor process needs to fit with a desired cogeneration target and vice versa. It is also often necessary to calculate the potential co-generation and allocation for, e.g., steam and electricity, prior to the detailed design of both the process and utility facilities.

State-of-the-art methods and arguably the most well-known commercial software for combined steam and power targeting and simulation include the "Total-Site-Analysis" graphical targeting method, which is utilized in AspenTech, UMIST, KBC, and other commercial process simulation packages, and combined heat and power system simulation packages such as, for example, SUPERTARGET and "Prosteam" of KBC, and "Star" of UMIST. The following papers present examples of various attempts at cogeneration targeting: Linnhoff, B. and Dhole, V. "Total Site Targets for Fuel, Cogeneration, Emissions and Cooling" (1993); Kokossis, A. and Mavromatis, S. "Conceptual Optimization of Utility Networks for Operational Variations-I. Targets and Level Optimization" (1997); and Mohan, T and El-Halwagi, M., "An Algebraic Targeting Approach for Effective Utilization of Biomass in Combined Heat and Power Systems through Process Integration" (2006), each incorporated by reference in its entirety.

It is Applicants understanding that the Total-Site-Analysis "graphical method," however, only defines approximate power generation targets; is not rigorous; and does not provide a complete global targeting method for combined heat and power systems under each substantially significant possible combination of process changes. Particularly, the method does not provide global targets, and does not include each major steam supply and/or demand sources. Additionally, it is iterative, requiring manual enumeration through the establishment of new graphs every time the process conditions change. It also does not allow targeting for different process needs due to several possibilities of steam-electricity generation and load allocation, for example, in process drivers.

The recently introduced "algebraic method," although arguably an improvement over the "graphical method," also lacks rigor, lacks the capability of handling varying process conditions, and can only address single objectives. In addition, the algebraic method also requires iterations to handle variable process conditions in order to calculate a single objective target.

The combined heat and the power simulation software packages mentioned above simulate the steam and power system, but do not have a systematic targeting capability for different steam and power system objectives. In such software environments, to target for different steam and power systems objectives, multiple iterations are needed through simulation runs to calculate targets independently. In other words, conventional software packages can not handle multiple targets, simultaneously. Also, conventional software can only handle varying conditions, one at a time, and require manual enumeration to calculate for each possible substantially significant combination of variation in supply and demand at different levels. In summary, the conventional methods and software provide more of an analysis tool than a targeting tool.

Recognized by the Applicants is the need for a system, program product, and methods that provide rigorous automated calculations of cogeneration and allocation, for example, of both steam and electricity, to enable process and utility designers and operators to orchestrate in-situ steam and electricity generation and allocation in industrial facilities under varying process conditions. Also recognized is the need for a system, program product, and methods: that have a systematic targeting capability for different combined-steam and power system objectives; that do not require manual iterations through simulation runs to calculate targets for steam and power system; that can also handle multiple targets at one time to thereby solve some of the problems associated with prior system's handling of varying conditions one at a time; and that do not require manual enumeration to determine a target for each possible combination of variations in supply and demand, at different levels.

Also recognized is the need for a system, program product, and methods: that provide global targets; that can accurately define lower and upper bounds of power generation targets; that include each major steam supply and/or demand sources; that allow targeting for different process needs due to several possibilities of steam-electricity load allocation in process drivers, e.g., for combined heat and power systems, under each possible combination of process changes; and that allow calculating multiple targets of duel commodities due to each possible combinations of process structural and parametric conditions, different electricity and steam load allocation, and/or process operations disturbances and uncertainty, systematically and without manual enumeration—i.e., do not need manual enumeration, such as through the establishment of new case, every time process conditions change.

SUMMARY OF THE INVENTION in view of the foregoing, various embodiments of the present invention advantageously provide an improved system, program product, and method for rigorously targeting for multiple commodities, such as steam and electricity, in process facilities or clusters of process facilities to obtain supply and demand best case and worst case scenarios due to varying process conditions (e.g., supply (generation)/demand). Various embodiments of the present invention can define multiple targets (e.g., requirements/capabilities) for desired steam objective(s) subject to desired electricity objective(s), and vice-versa, simultaneously for each significant steam and electricity objective under varying process conditions (e.g., various combinations of process conditions modifications and/or process disturbances and uncertainty) for a process or cluster of processes. Various embodiments of the present invention can also determine the optimal steam and electricity supply-demand scenarios for a given process facility or cluster of process facilities. Various embodiments of the present invention further include systems, program product, and methods which are capable of calculating multiple targets of dual utilities commodities due to possible (probable) combinations of process structural and parametric conditions, different electricity and/or steam load allocations, and process operations disturbances and/or uncertainty, systematically, without the need for manual enumeration.

Various embodiments of the present invention, functioning in its/their "Targeting Mode," for example, can advantageously define, for a process or cluster of processes, a plurality of global targets, including global minimum or maximum steam generation requirements for mass and heating purposes, fuel generation requirements, in-situ steam generation requirements, steam export capabilities, boiler feedwater makeup requirements, steam de-superheating water requirements, steam importation requirements, steam condensation capabilities, in-situ electricity generation capabilities, electricity importation requirements, and/or electricity export capabilities, for example, due to each possible combination of process condition modifications and/or due to each possible combination of process disturbances and uncertainty ("single objective mode"), or subject to other desired objective(s) due to each possible combination of process condition modifications and/or due to each possible combination of process disturbances and uncertainty ("multi-objective mode").

Various embodiments of the present invention, functioning in its/their "Find Solution Mode," for example, can identify or determine, for a process or cluster of processes, optimal supply and demand scenarios (e.g., discrete conditions) that render or attain a desired process steam and electricity consumption, process steam and electricity generation, plant utility system in-situ generation, and steam and electricity export and import level targets, etc., due to each possible combination of process condition modifications, individually, or subject to other desired objective(s), and/or due to each possible combination of process disturbances and uncertainty, systematically and without manual enumeration. These optimal scenarios can advantageously result in rigorous targeting for the appropriate level of process modifications.

Various embodiments of the present invention, functioning in its/their "Simulation Mode," for example, can advantageously introduce a new approach to simulation in which the user can explore the effect of interval-based values of variables and parameters on system output. These simulations can advantageously provide such system output as a value range of requirements and/or capabilities, respectively, due to such all-at-one-time variables and parameter changes.

More specifically, embodiments of the present invention provide a system to optimize energy management for a site including a combined steam heat and electrical power system having a plurality of resource streams embodying a plurality of process units each having at least one operational attribute. For example, a system, according to an embodiment of the present invention, can include an energy modeling computer having a processor, and memory coupled to the processor to store software therein, and energy modeling program product stored, for example, in the memory of the energy modeling computer, to optimize energy management. According to an embodiment of the present invention, the program product can include instructions that when executed, for example, by the energy modeling computer, cause the computer to perform the operations of receiving data indicating a potential range of attribute values for a first operational attribute and data indicating a potential range of attribute values for a second operational attribute for each of a plurality of process units, collectively defining input data. The operational attributes having range values can include, for example, steam supply/generation and steam demand data. Other operational attributes can include the number of steam headers and their respective pressure, temperature, and specific enthalpy. The operations can also include determining at least one, but more preferably a plurality of global steam target along with at least one, but more preferably a plurality of global electricity targets associated therewith using a cascade algorithm responsive to the input data. The at least one global steam target can include a global minimum steam importation requirement, a global maximum steam importation requirement, a global minimum steam exportation capability, and/or a global maximum steam exportation capability, and the at least one global electricity target can include a global minimum electricity cogeneration capability and a global maximum electricity cogeneration capability. According to an embodiment of the program product, the operations of determining at least one global steam target along with at least one global electricity target can be performed for each respective potential range of values for one or more of the operational attributes of each of the plurality of process units, without manual enumeration. Further, according to an embodiment of the program product, the respective potential ranges of values for such operational attribute can encompass each significantly potential combination of process condition modifications and each significantly potential combination of process disturbances and uncertainty for the site.

According to another embodiment of the program product, the input data related to the plurality of process units can account for each substantial steam supply source for the site and a plurality of resource streams embodying the process units can include a corresponding plurality of steam headers for the site; and the respective potential range of values for at least one operational attribute for each of the plurality of process units can encompass each significantly potential combination of process condition modifications and each significantly potential combination of process disturbances and uncertainty for the site.

According to yet another embodiment of the program product, the operations can further include determining a global minimum energy target for a first type of process or utility (e.g., a global minimum steam or electricity target) subject to a desired global energy target for a second different type of process or utility (e.g., a global maximum electricity or steam target) and vice versa. According to another embodiment of the program product, the operations can further include determining substantially discrete supply and demand conditions for each of the plurality of process units to attain the at least one global minimum energy target, which can be performed for a first type of process or utility subject to at least one other desired global energy target objective for a second different type of process or utility.

Various embodiments of the present invention also include methods for optimizing energy management for a site including a combined steam heat and electrical power system having a plurality of process units, for example, each having at least one operational attribute. For example, a method, according to an embodiment of the present invention, can include the steps of receiving data indicating a plurality of sets of values, each set of values defining a potential range of attribute values for at least one first operational attribute and data indicating a potential range of attribute values for a second operational attribute of a separate one for each of a corresponding plurality of resource streams process units, collectively defining input data. The operational attributes having range values can include, for example, steam supply/generation and steam demand data. Other operational attributes can include the number of steam headers and their respective pressure, temperature, and specific enthalpy. The operations can also include determining at least one global steam target along with at least one global electricity target associated therewith using a cascade algorithm responsive to the input data. The steps can also include determining a plurality of global steam targets along with at least one global electricity target, which can be performed for each respective potential range of values for the at least one operational attribute of each of the plurality of process units, without manual enumeration. Further, the respective potential ranges of values for one or more operational attributes for each of the plurality of process units can encompass each significantly potential combination of process condition modifications and each significantly potential combination of process disturbances and uncertainty, for the site.

According to another embodiment of the method, the data related to the plurality of process units can account for each substantial steam supply source for the site; the plurality of resource streams embodying the process units can include a corresponding plurality of steam headers for the site; and the respective potential range of values for at least one operational attribute for each of the plurality of process units can encompass each significantly potential combination of process condition modifications and each significantly potential combination of process disturbances and uncertainty for the site.

According to yet another embodiment of the method, the method can include determining a global minimum energy target for a first type of process or utility (e.g., a global minimum steam or electricity target) subject to a desired global energy target for a second different type of process or utility (e.g., a global maximum electricity or steam target), and vice versa. According to another embodiment of the method, the steps can further include determining substantially discrete supply and demand conditions for each of the plurality of process units to attain the at least one global minimum energy target, which can be performed for a first type of process or utility subject to at least one other desired global energy target objective for a second different type of process or utility.

Various embodiments of the present invention can also include a computer readable medium that is readable by a computer to optimize energy management for a site including a combined steam heat and electrical power system. The computer readable medium can include a set of instructions that, when executed by the computer, cause the computer to perform the operations of receiving data indicating a potential range of attribute values for a first operational attribute and data indicating a potential range of attribute values for a second operational attribute for each of a plurality of process units, collectively defining input data. The operational attributes having range values can include, for example, steam supply/generation and steam demand data. Other operational attributes can include the number of steam headers and their respective pressure, temperature, and specific enthalpy. The operations can also include determining at least one global steam target along with at least one global electricity target responsive to the input data. The operations can further include determining a plurality of global maximum energy targets; and the operation of determining at least one global steam target along with at least one global electricity target associated therewith using a cascade algorithm can be performed for each respective potential range of values for one or more of the operational attributes of each of the plurality of process units, without manual enumeration. Further, according to an embodiment of the computer readable medium, the respective potential range of values for at least one operational attribute for each of the plurality of process units can encompass each significantly potential combination of process condition modifications and each significantly potential combination of process disturbances and uncertainty, for the site.

According to another embodiment of the computer readable medium, the received data related to the plurality of process units can account for each substantial steam supply source for the site and the plurality of resource streams embodying the process units can include a corresponding plurality of steam headers for the site; and the respective potential range of values for at least one operational attribute for each of the plurality of process units can encompass each significantly potential combination of process condition modifications and each significantly potential combination of process disturbances and uncertainty for the site.

According to yet another embodiment of the computer readable medium, the operations can include determining a global minimum energy utility target for a first type of process or utility (e.g., steam or electricity) subject to a desired global energy utility target for a second different type of process or utility (e.g., electricity or steam). According to another embodiment of the computer readable medium, the operations can further include determining substantially discrete supply and demand conditions for each of the plurality of process units to attain the at least one global minimum energy target, which can be performed for a first type of process or utility subject to at least one other desired global energy target objective for a second different type of process or utility.

Various embodiments of the present invention provide the missing targeting capability needed in the current combined heat and power system simulation commercial software packages. Various embodiments of the present invention also provide a capability for back-of-the-envelope calculations that enable a user to define optimal operating scenarios of combined steam-electricity for given objectives, without iteration or exhaustive enumeration. Various embodiments of the present invention also provide more rigorous targeting approaches than that provided by the current state-of-the-art graphical approaches. According to yet another aspect of various embodiments of the present invention, there is provided an energy consumption modeling system that includes or incorporates the methods as described above.

Various embodiments of an improved system, program product, and methods, are provided, which allow a steam and power system to have a systematic targeting capability for different combined steam and power system objectives. In order to target for steam and power systems, a user advantageously does not need to perform iterations of simulation runs to calculate these targets. An example of such a system, program product, and method can also handle multiple targets at one time, solving the problem of the current methods, systems, and software of only handling varying conditions, one discrete iteration at a time. That is, such new approach advantageously does not require manual enumeration, and the associated extensive consumption of time, to target for each possible substantially significant combination of variations in supply and demand at different levels. In contrast to the "Total-Site-Analysis graphical method," various embodiments of the present invention utilize a rigorous method, give global targets, accurately define lower and upper bounds of power generation targets, and include each significant steam supply and/or demand source. According to such embodiments of the present invention, the system, program product, and methods are not iterative as viewed by the user and do not need enumeration through the establishment of a new case every time process conditions change, but allow targeting for different process needs due to several possibilities of steam-electricity load allocation in process drivers. In sum, such embodiments of the present invention provide global targeting for combined heat and power systems under each possible combination of process changes.

Various embodiments of the present invention also provide several commercial benefits. For example, the application of a unique advanced methodology, automated in a user-friendly program product, allows for optimal design, and efficient operation, of combined heat and power utility plants in industrial facilities. Applying such embodiments of the present invention can provide industrial companies that utilize it, with an edge with regard to energy efficiency consumption and pollution minimization in designing and operating their facilities. A sound improvement in energy efficiency optimization beyond what is presently available from the state-of-art tools and technology, realized through application of one or more embodiments of the present invention, can result in saving of tens of millions of dollars per year to industry in energy consumption and a huge savings in project capital, especially from a utility plant's point of view.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 3 is a schematic diagram of a graphical user interface for entering integer, real, or range data according to an embodiment of the present invention;

FIG. 14 is a schematic diagram of a graphical user interface for entering integer, real, or range data to run a simulation according to an embodiment of the present invention;

DETAILED DESCRIPTION

The present invention will now be described more fully hereinafter with reference to the accompanying drawing, which illustrates an embodiment of the invention. This invention may, however, be embodied in many different forms and should not be construed as limited to the illustrated embodiment set forth herein. Rather, this embodiment is provided so that this disclosure will be thorough and complete, and will fully convey the scope of the invention to those skilled in the art. Like numbers refer to like elements throughout. Prime notation, if used, indicates similar elements in alternative embodiments.

As shown in FIGS. 1-25, embodiments of the present invention provide an improved system, program product, and methods to rigorously target for multiple processes and utilities such as steam and electricity to obtain, for example, the supply and demand best case and worst case scenarios under varying process conditions for given process facility or cluster of process facilities. As will be described or detailed below, various embodiments of the present invention can define these targets (e.g., requirements/capabilities) for desired steam objectives such as, for example, minimum or maximum steam consumption, minimum or maximum steam export, minimum or maximum steam let-down and minimum vent, independently, or subject to desired electricity objectives such as, for example, minimum or maximum in-situ electricity generation, minimum or maximum electricity importation, minimum or maximum electricity exportation and minimum or maximum electricity allocation to process drivers, and vice-versa, under varying process conditions, simultaneously. Various embodiments of the present invention can also determine the optimal steam and electricity supply-demand scenarios attainable for a given process facility or cluster of process facilities. Various embodiments of the present invention are capable of determining simultaneous multiple targets of dual utilities commodities under the various combinations of process structural, parametric conditions, electricity load allocations and process operations disturbances and uncertainty, systematically and without enumeration. Various embodiments of program product, for example, in simulation mode, can introduce a new approach in simulation in which the user can explore the effect of interval-based values of variables and parameters on system output. Those skilled in the art should appreciate that the embodiments of the present invention may encompass specific hardware or apparatus used to implement the embodiments of the present invention in addition to a computer program product programmed into programmable logic or digital devices adapted to execute to a number of processing steps to achieve the aims of the invention.

Figure 1:
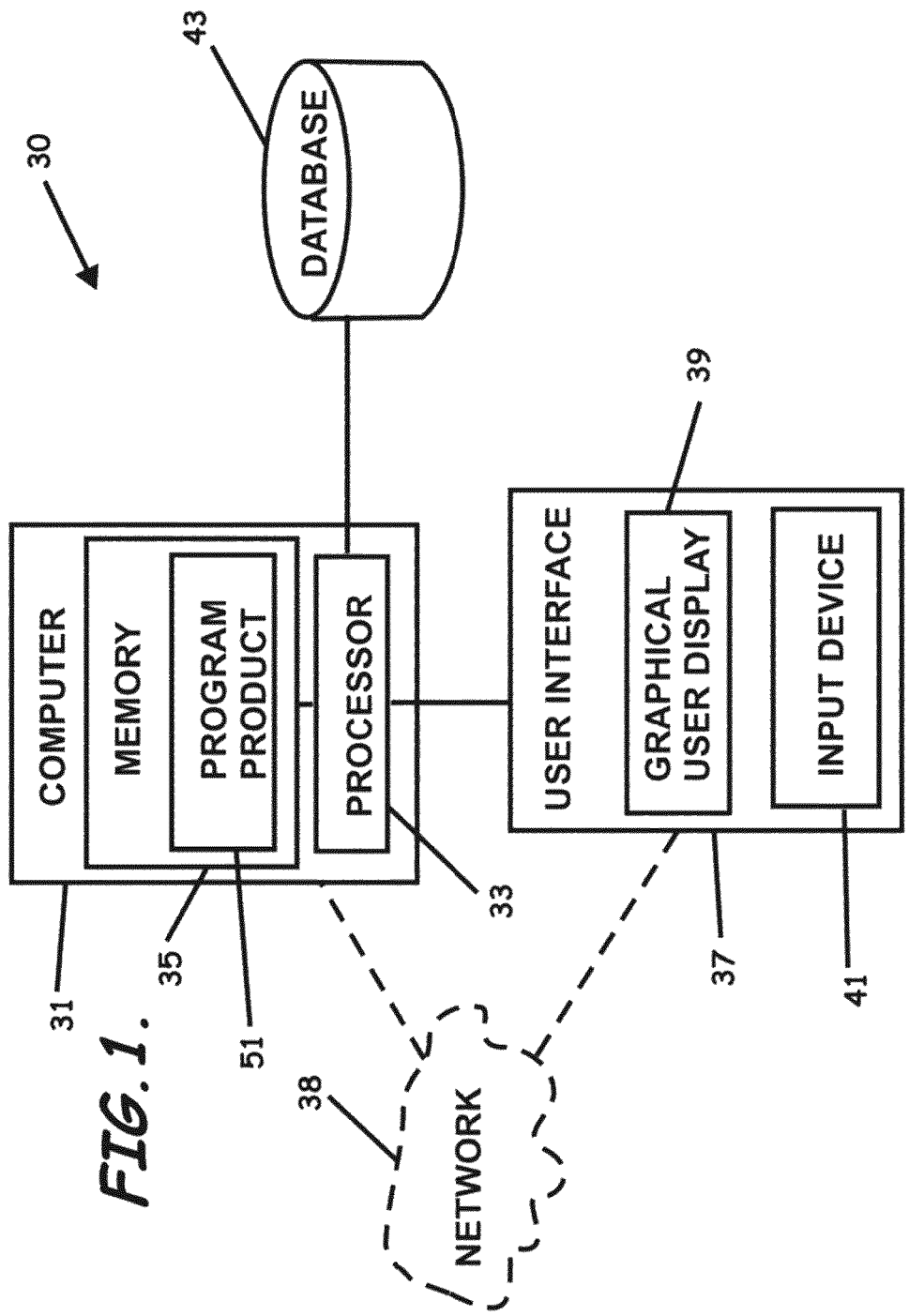
FIG. 1 is a schematic diagram of a system to optimize energy management for a site having a plurality of process units according to an embodiment of the present invention.

FIG. 1 illustrates a system 30 to optimize energy management for a site having a plurality of resource streams or processes forming process units, each having at least one, but more typically, a plurality of operational attributes (e.g., steam inlet/supply/generation, and steam outlet/demand). The system 30 can include an energy modeling computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server serving multiple user interfaces 37. Accordingly, the user interface 37 can be either directly connected to the computer 31 or through a network 38, as known to those skilled in the art.

The system 30 can also include a database 43 stored in the memory 35 (internal or external) of the energy modeling computer 31 and having a plurality of sets of values each separately defining a potential range of values for operational attributes for each of a plurality of process units/resource streams, e.g., steam-related attributes and/or conditions (collectively "attributes"). Such attributes can include, for example, a lower and an upper boundary value for steam supply/generation and steam demand for each of the processes associated with each of a plurality of steam headers, along with pressure, temperature, and specific enthalpy, for each of the steam headers (see, e.g., FIG. 3).

The system 30 can also include energy modeling program product 51 stored in memory 35 of the energy modeling computer 31 and is adapted: to provide rigorous targeting for multiple commodities, such as steam and electricity, in process facilities or clusters of process facilities to obtain supply and demand best case and worst case scenarios due to varying process conditions (e.g., supply (generation) and/or demand); to define multiple targets (e.g., requirements and/or capabilities) for desired steam objective(s) subject to desired electricity objective(s), and vice-versa, simultaneously for each significant steam and electricity objective under varying process conditions; and to determine the optimal steam and electricity supply-demand scenarios for a given process facility or cluster of process facilities capable of calculating multiple targets of dual utilities commodities due to possible (probable) combinations of process structural and parametric conditions, different electricity and/or steam load allocations, and process operations disturbances and/or uncertainty, systematically, without the need for manual (trial and error) enumeration, inherent in other prior systems.

Note, the energy modeling program product 51 can be in the form of microcode, programs, routines, and symbolic languages that provide a specific set for sets of ordered operations that control the functioning of the hardware and direct its operation, as known and understood by those skilled in the art. Note also, the energy modeling program product 51, according to an embodiment of the present invention, need not reside in its entirety in volatile memory, but can be selectively loaded, as necessary, according to various methodologies as known and understood by those skilled in the art.

Figure 2:
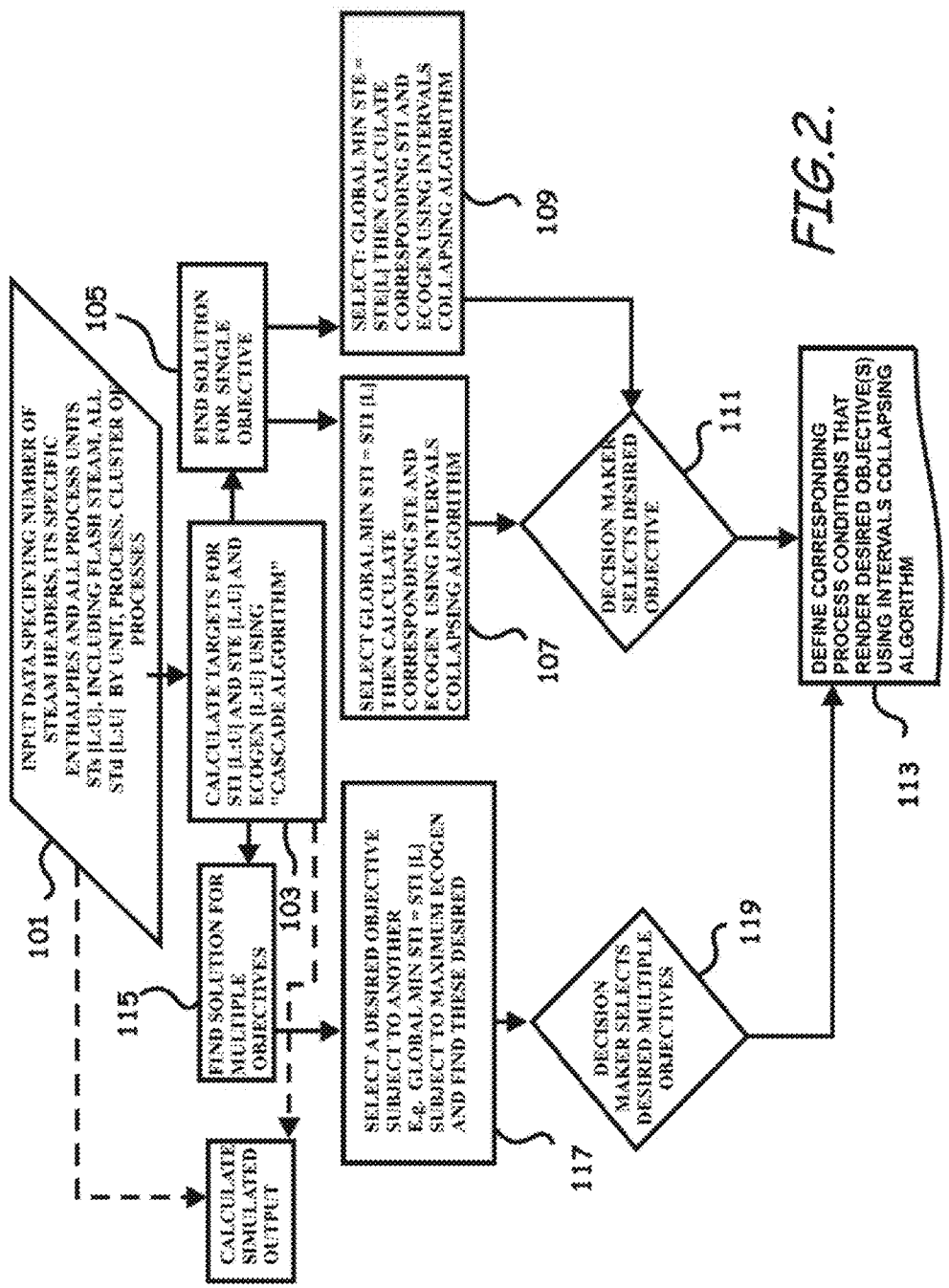
FIG. 2 is a schematic flow diagram of a method for optimizing energy management for a site according to an embodiment of the present invention.

FIG. 2 illustrates a high-level flow diagram illustrating a method of optimizing energy management for a site having a plurality of resource streams embodying a plurality of process units, according to an embodiment of the present invention, which implement at least portions of the energy modeling program product 51. As shown in block 101, the method can include receiving input data entered by a user and/or previously entered and stored in the database 43. The data can include, for example, specification of a number of steam headers and specific enthalpies therewith, and for each process unit, the minimum and maximum steam flow values for steam supply (STs [L:U]), including flash steam, and steam demand (STd [L:U]) by unit, process, or cluster of processes. At least portions of such data can be entered into a table (see, e.g. FIG. 3) and/or directly into a flow diagram, such as that shown in FIG. 4 or FIG. 9, when displayed on the graphical user display 39 of the user interface 37. Alternatively, at least portions of such data can be acquired through automated systems as known to those skilled in the art. Note, in the flow high-level diagram, the "L" refers to low or minimum value of the range or interval and the "U" refers to the high or maximum value of the range or interval. Further, in the flowcharts "H" stands for "steam header." Still further, with respect to FIGS. 3-8, the steam flow is in 100,000 pounds per hour (lb/h), specific enthalpies in British Thermal Units per pound (BTUs/lb), pressure in pounds per square inch (psia), and temperature in degrees Fahrenheit (° F.).

As shown in block 103, according to an embodiment of the present invention, in its "Targeting Mode," the program product 51, as implemented by the illustrative method, can calculate: Steam Import (STI), Steam Export (STE), and In-situ Electricity Generation/Cogeneration (ECOGEN), along with Plant Electricity Import (ELECIMP), Plant Electricity Export (ELECEXP), Fuel Consumption (FUELCONSUM), Plant Water Make-up (WTRMAKE), Condensate Return (CONDRTRN), and/or De-Superheating water (DESUPHTWTR); using one or more of the following manual or automated inputs: Steam Demand (STD), In-Plant/Process Steam Generation (STS), Fuel Heating Value (FHV), Electricity Demand (ELECD), Water Enthalpy (WTRENTH), and Flash Steam Fraction (FLASHSTM), for example, due to each possible combination of process condition modifications and/or due to each possible combination of process disturbances and uncertainty ("single objective mode"), or subject to other desired objective(s) due to each possible combination of process condition modifications and/or due to each possible combination of process disturbances and uncertainty ("multi-objective mode").

FIGS. 3-8 and the following text illustrate an example of calculations performed in block 103. Specifically, according to the illustrative example, the inlet/supply and outlet/demand of steam resource in a process or cluster of processes are sorted in a descending order from pressure/temperature point of view, and each step represents a "TEMPERATURE STEP" or "PRESSURE STEP" referred to as "S." The number of these steps, according to the illustrative example, correspond to the number of already exists or planned to exist steam headers in the facility; and such pressure or temperature step data is user input data. Each steam supply/input and demand/output for a pressure step can be in the form of intervals, real numbers or combination. Further, as will be described later, a dummy "pressure step" can be assigned to flash steam supply produced from a higher "pressure step" steam demand condensate, and two dummy "pressure steps" can be assigned to each steam-turbine used as a process driver, one for the demand with zero supply for such steam driver and the second one for the supply with zero demand.

The completion of this calculation step results in "N+D" number of pressure steps. The total number of pressure steps "N+D" are equal to the total number of steam headers (H), i.e., "N" which varies from 0, 1, 2, ..., N plus the total number of dummy headers (D). The pressure step number "0" represents the external steam supply/net process demand. Steam output from this external pressure step have two initial values: $ST_0^{low\_output}=0.0$ in "mass units" and $ST_0^{high\_output}=0.0$ in "mass units." Each pressure step (S), greater than 0 has steam surplus $ST_s^{surplus}$. Such steam surplus has two calculated values: $ST_s^{low\_surplus}$ and $ST_s^{high\_surplus}$. It also has steam output $ST_s^{output}$ from one pressure step to another. Such steam output $ST_s^{output}$ have also two calculated values: $ST_s^{low\_output}$ and $ST_s^{high\_output}$. These values are calculated as follows for S=1, 2, ..., N+D.

In a cogeneration mode, the above calculations allow for ready determination of the global minimum and maximum steam utility (STI) requirements, without steam de-superheating during let-downs. Particularly, the global steam importation requirement (lower and upper bounds) can be provided in the form of a steam importation interval, determined according to the following calculation:

$$STI=[STI(\text{minimum}), STI(\text{maximum})];$$

where:
STI(minimum)=ABS Min{Min[$ST_s^{high\_output}$], 0.0},
STI(maximum)=ABS Min{Min[$ST_s^{low\_output}$], 0.0},
S=1, 2, ..., N,
N is a total number of real steam headers,
D is a total number of dummy headers,
N+D is a total number of pressure steps, and
ABS is the absolute of the value between brackets;

where:

$$ST_s^{high\_output} = ST_{s-1}^{high\_output} + ST_s^{high\_Surplus},$$

$$ST_s^{low\_output} = ST_{s-1}^{low\_output} + ST_s^{low\_Surplus},$$

$$ST_s^{high\_surplus} = \left(\sum_{k=1}^{n_s} ST s_k^{high} - \sum_{j=1}^{m_s} = STd_j^{low}\right), \text{ and}$$

$$ST_s^{low\_surplus} = \left(\sum_{k=1}^{n_s} ST s_k^{low} - \sum_{j=1}^{m_s} = STd_j^{high}\right);$$

where:
$n_s$ is the number of steam supply sources,
$m_s$ is the number of steam demand sinks represented in the $S^{th}$ pressure step,
$ST_0^{high\_output}=0.0$,
$ST_0^{low\_output}=0.0$,
[$STs_1$]: Steam supply to header # one as interval (from in-situ process generation),
[$STs_2$]: Steam supply to header # two (from in-situ process generation),
[$STs_N$]: Steam supply to header # N (from in-situ process generation),
[$STd_1$]: Steam demand from header # one,
[$STd_2$]: Steam demand from header # two,
[$STd_N$]: Steam demand from header # N, and
[ ]: Is interval of any variable and/or target with lower bound (minimum) and upper bound (maximum);
where:
$ST_{s_k}^{low}$: is the low value of a steam supply flowrate term,
$ST_{s_k}^{high}$: is the high value of the steam supply flowrate term,
$ST_{d_j}^{low}$: is the low value of a steam demand flowrate term, and
$ST_{d_j}^{high}$: is the high value of the steam demand flowrate term.

The above calculations allow for ready determination of the global minimum and maximum electricity cogeneration capability (ECOGEN). Particularly, the global electricity cogeneration capability (lower and upper bounds) can be provided in the form or a electricity cogeneration interval, determined according to the following calculation:

ECOGEN=[(ECOGEN_low),(ECOGEN_high)];

where:

$$(\text{ECOGEN\_low}) = \sum_{s=1}^{N+D} (\text{ECOGEN\_low})s, \text{ and}$$

$$(\text{ECOGEN\_high}) = \sum_{s=1}^{N+D} (\text{ECOGEN\_high})s;$$

where:
(ECOGEN_low)$_s$=$ST_s^{low\_output}$*(Efficiency_low)*($H_{s-1}$-$H_s$), and
(ECOGEN_High)$_s$=$ST_s^{high\_output}$*(Efficiency_high)* ($H_{s-1}$-$H_s$); and
The ($H_{s-1}$-$H_s$) is a specific enthalpy difference between upper pressure and lower pressure steps. The (Efficiency_low) is an arbitrary lower bound number for electricity generation efficiency. Using a steam turbine as a reference component, it can be readily set as a minimum possible efficiency from experience and/or vendor data. The (Efficiency_high) is an arbitrary upper bound number for electricity generation efficiency. Also, using the steam turbine as a reference component, it can be readily set as a maximum possible efficiency from experience and/or vendor data.

The above calculations also allow for ready determination of the global minimum and maximum steam export capability/vent or condensation (waste), collectively steam exportation capability (STE). Particularly, the global steam exportation capability (lower and upper bounds) can be provided in the form of a steam exportation interval, determined according to the following calculation:

$$STE=[STE(minimum), STE(maximum)];$$

where:
   STE(minimum)=ABS Min{Min[$ST_s^{high\_output}$], 0.0},
   STE(maximum)=ABS Min{Min[$ST_s^{low\_output}$], 0.0};
where:
   $ST_0^{low\_output}$=ZSTI(maximum),
   $ST_0^{high\_output}$=ZSTI(maximum),
   ZSTI(minimum)=ABS Min{Min[$ST_s^{high\_output}$], 0.0},
and
   ZSTI(maximum)=ABS Min{Min[$ST_s^{low\_output}$], 0.0};
and
where:

$$ST_s^{high\_output} = ST_{s-1}^{high\_output} + ST_s^{high\_Surplus},$$

$$ST_s^{low\_output} = ST_{s-1}^{low\_output} + St_s^{low\_Surplus},$$

$$ST_s^{high\_surplus} = \left(\sum_{k=1}^{n_s} STS_k^{high} - \sum_{j=1}^{m_s} = STd_j^{low}\right), \text{ and}$$

$$ST_s^{low\_surplus} = \left(\sum_{k=1}^{n_s} STS_k^{low} - \sum_{j=1}^{m_s} = STd_j^{high}\right).$$

As can be seen above, according to this illustration, in order to calculate the global minimum and maximum steam exportation capability, a new variable arbitrarily labeled as ZSTI was utilized. In particular, the symmetric image of the above ZSTI interval was utilized in the pressure step number "0" to represent the external steam utility in pressure step number "zero". This symmetric image of the ZSTI interval renders the STI interval elements, but in a different order. Step number "zero" initially had two values: $ST_0^{low\_output}$=0.0 in "mass units" and $ST_0^{high\_output}$=0.0 in "mass units." To calculate the global minimum and maximum steam exportation capability, $ST_0^{low_{output}}$ was set to ZSTI(maximum), and $ST_0^{high\_output}$ was set to ZSTI(minimum), and the calculations described with respect to those to determine STI were made using these two new values instead of the "zero" values used before. Upon completing all pressure intervals calculations, the output of the last interval is then the global minimum and the global maximum of steam export, and vent or condensation (e.g., waste), sometimes collectively referred to as steam exportation.

Figure 4:
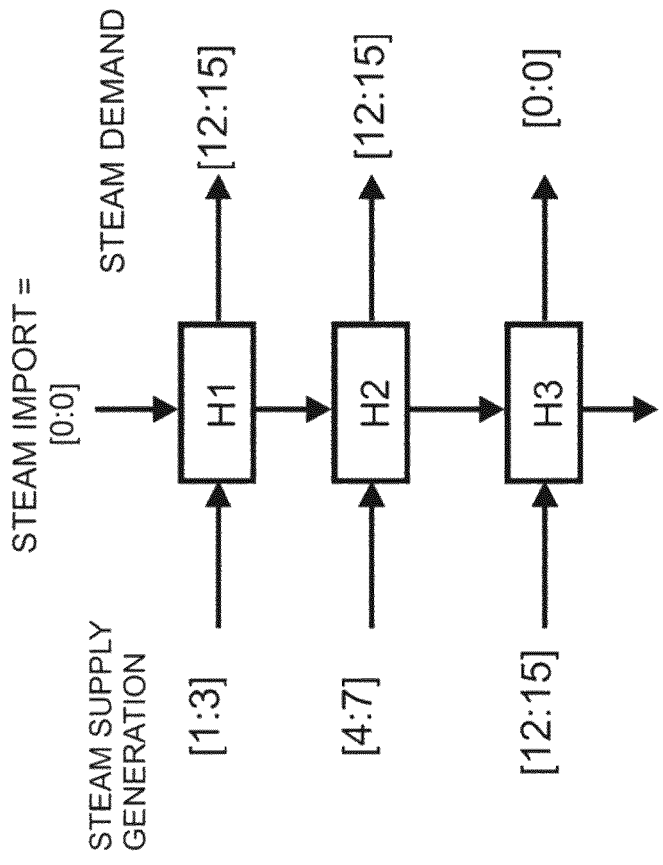
FIG. 4 is a schematic flow diagram illustrating the data entered in the graphical user interface shown in FIG. 3 represented in a combination of processes and pressure (or temperature) steps organized in descending order according to an embodiment of the present invention.
Figure 5:
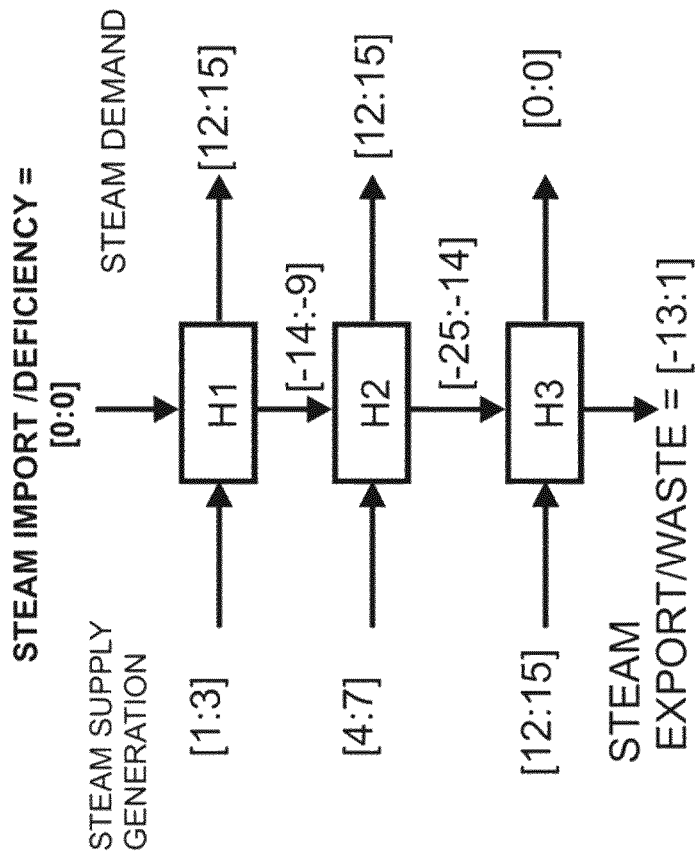
FIG. 5 is a schematic flow diagram illustrating a calculation of the steam export/waste for each pressure step according to an embodiment of the present invention.
Figure 6:
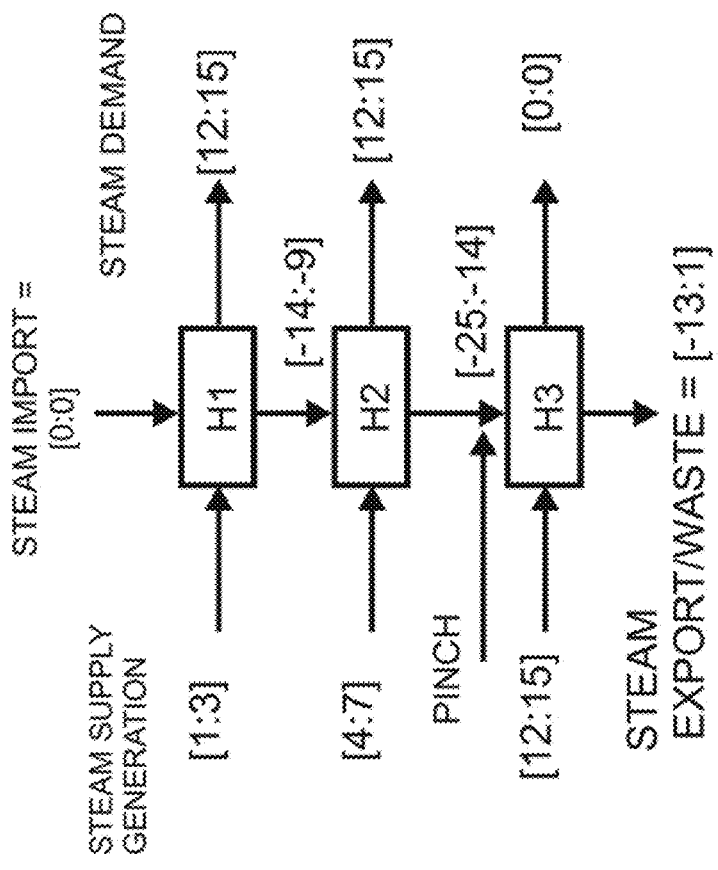
FIG. 6 is a schematic flow diagram illustrating identification of the location of where a "pinch" occurs according to an embodiment of the present invention.
Figure 7:
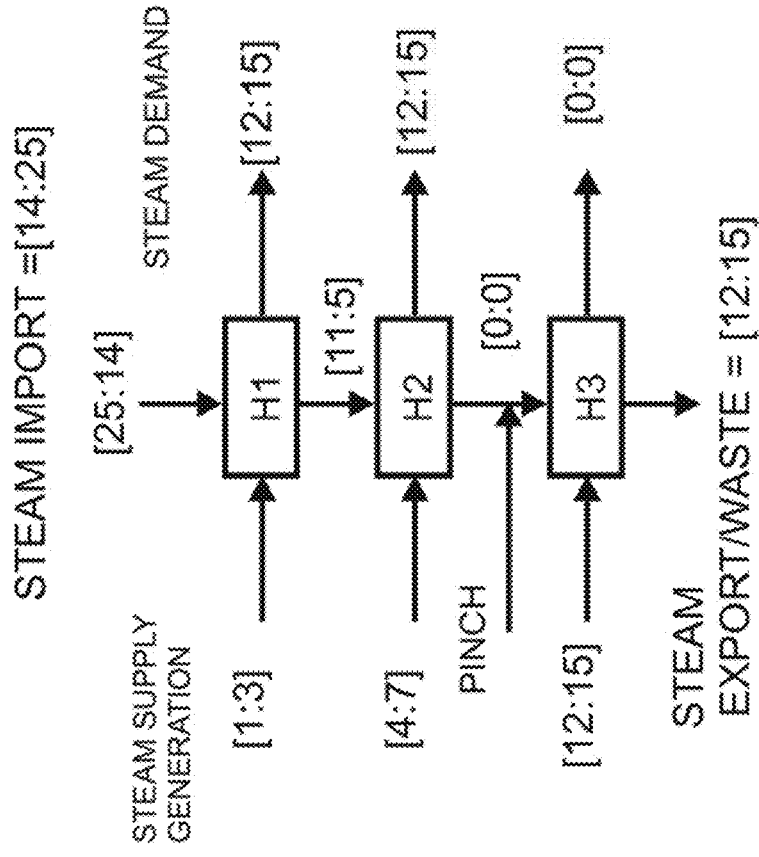
FIG. 7 is a schematic flow diagram illustrating utilization of the inverse of the pinch values to determine steam export/waste for the combination of the processes and pressure/temperature steps according to an embodiment of the present invention.
Figure 8:
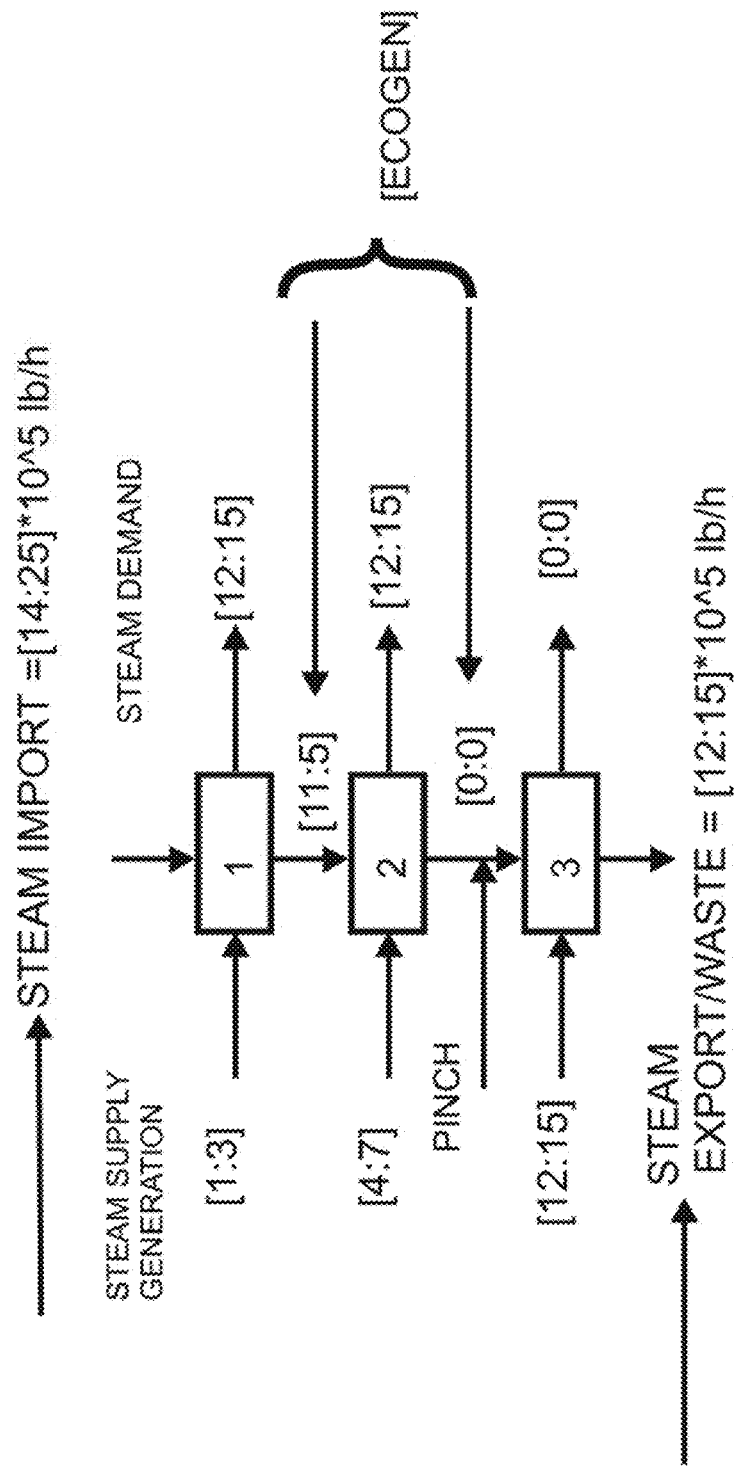
FIG. 8 is a schematic flow diagram illustrating determining in-situ electricity cogeneration capability for a combination of the processes and pressure steps according to an embodiment of the present invention.

As noted above, FIG. 3 illustrates a table for providing for user data entry, or for displaying data for a three-dimensional steam header system, entered, for example, via manual and/or automated systems. FIGS. 4-8 provide an enhanced graphical illustration of the illustrative calculations. Particularly, FIG. 4 illustrates the data provided in the "steps" organized in descending order. FIG. 5 illustrates a calculation of the steam export/waste for each pressure step. FIG. 6 illustrates identifying where a "pinch," as known and understood by those skilled in the art, occurs. FIG. 7 illustrates utilization of the inverse of the pinch values to determine steam export/waste STE for the combination of the processes and pressure steps. FIG. 8, finally, illustrates determining the in-situ electricity cogeneration capability ECOGEN for the combination of the processes and pressure steps. As an example, in a simplified form, $$ECOGEN = \begin{bmatrix} \text{steam-low} * \text{efficiency-low} * (H1 - H2): \\ \text{steam-high} * \text{efficiency-high} * (H1 - H2) \end{bmatrix},$$

$$ECOGEN = ECOGEN1 + ECOGEN2,$$

$$= \begin{bmatrix} 5*10^5 * 0.8 * (1327 - 1227): \\ 11*10^5 * 0.9 * (1327 - 1227) \end{bmatrix},$$

$$= [40:99] \text{ MM Btu/h} +$$

$$\begin{bmatrix} 0.0 * 0.8 * (1327 - 1227): \\ 0.0 * 0.9 * (1327 - 1227) \end{bmatrix},$$

$$= [0:0] \text{ MM Btu/h},$$

$$= [40:99] \text{ MM Btu/h}.$$

As noted above, additional global minimum and maximum targets can be readily calculated or otherwise determined. For example, Plant Electricity Import (ELECIMP) can be calculated using the following: [ELECIMP]=[ELECD]−1[ECOGEN]. Example: {[8:12]−[8:9]}=[−1:4]}. Note: If the subtraction process using interval math gives a negative lower value, it means the minimum/low ELECIMP is equal to zero. The absolute value of this negative is a maximum electricity to export(ELECEXP).

Plant Electricity Export (ELECEXP) can be calculated using the following: [ELECEXP]=[ECOGEN]−[ELECD]. Example: {[7:12]−[8:10]}=[−3:4]}. Note: If the subtraction process using interval math gives a negative lower value, first it means the minimum/low ELECEXP is equal to zero and in the same time the absolute value of this negative is maximum electricity to import(ELECIMP).

Fuel Consumption (FUELCONSUM) can be calculated using the following: [FUELCONSUM]={[STI]*H1/[BLR-EFF]*[FHV]}. Note: [BLREFF] is the first law efficiency interval of the boiler and is equal to [0.7:0.85] or {user input); and [FHV]: is fuel specific low heating value. Condensate Return (CONDRTRN) can be calculated using the following: [CONDRTRN]=[0.8:1]*{[STD]+[STE]}. Note: the [0.8:1] interval is constant or user input value. Plant Water Make-up (WTRMAKE) can be calculated using the following: [WTRMAKE]=[1:1]−[CONDRTRN].

Figure 9:
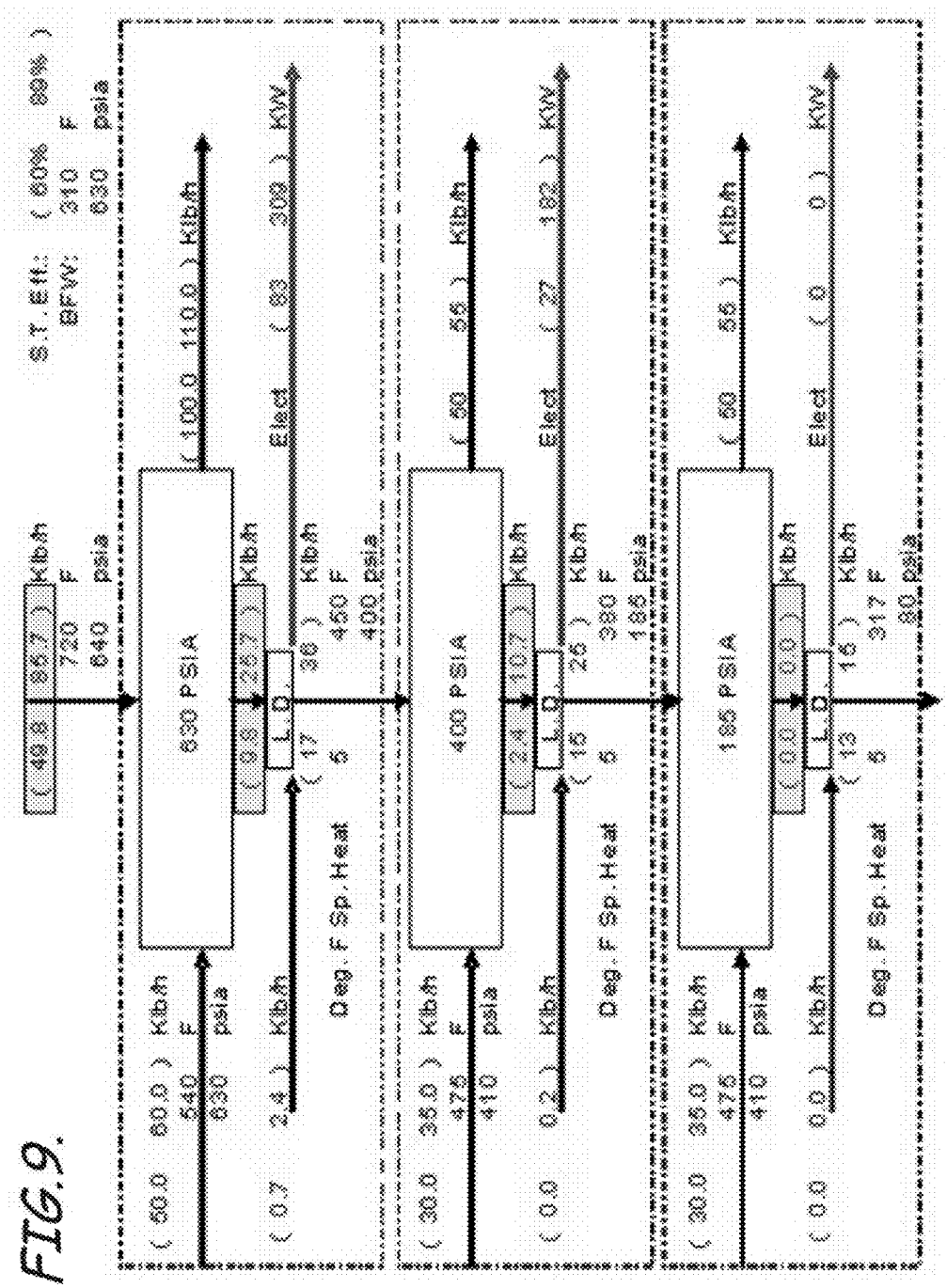
FIG. 9 is a schematic diagram of a graphical user interface illustrating a portion of a flow diagram according to an embodiment of a program product of the present invention.

FIG. 9 shows a schematic screen shot diagram of a user-friendly interface according to an embodiment of the program product 51. Upon the completion of entry of input data in form of intervals, the program product 51 automatically calculates the minimum and maximum targets for the utility system capability regarding steam, fuel and electricity, without enumeration. Upon the selection of a desire single objective target or a multiple objectives target, the combined steam, fuel and electricity systems capability can also be calculated automatically and without enumeration. In the multi-objective mode, the program product 51 can render global optimal targets, while solving bi-level or tri-level programming problems.

Referring again to FIG. 2, as shown in blocks 105, 107, 109, 111, and 113, according to an embodiment of the present invention, in its "Find Solution Mode," the program product 51, as implemented by the illustrative method, for example, can identify or determine, for a process or cluster of processes, optimal utilities supply and demand scenarios (e.g., discrete conditions) that render or attain the desired process steam and electricity consumption, process steam and electricity generation, plant utility system in-situ generation, and steam and electricity export and import levels, etc., due to each reasonably possible/expected combination of process condition modifications, individually, or as shown in blocks 113, 115, 117, and 119, subject to other desired objective(s), and/or due to each reasonably possible/expected combination of process disturbances and uncertainty, systematically and without manual enumeration.

Particularly, as shown in block 107, according to the illustrated embodiment of the present invention, having previously obtained the global minimum steam importation requirements ("[STI]=STI[L]"), if a single objective is desired (block 105), the global steam exportation capability interval [STE] and the global in-situ electricity cogeneration capability interval [ECOGEN] can be determined, for example, using the previously described intervals collapsing algorithm. Also or alternatively, as shown in block 109, having previously obtained the global minimum steam exportation capability ("[STE]=STE[L]"), if a single objective is desired (block 105), the global steam importation requirement interval [STI] and the global in-situ electricity cogeneration capability interval [ECOGEN] can be determined using, for example, the previously described intervals collapsing algorithm. Note, the intervals can be collapsed one by one via selecting a lower bound or upper bound while keeping the desired target(s) unchanged.

Figure 10:
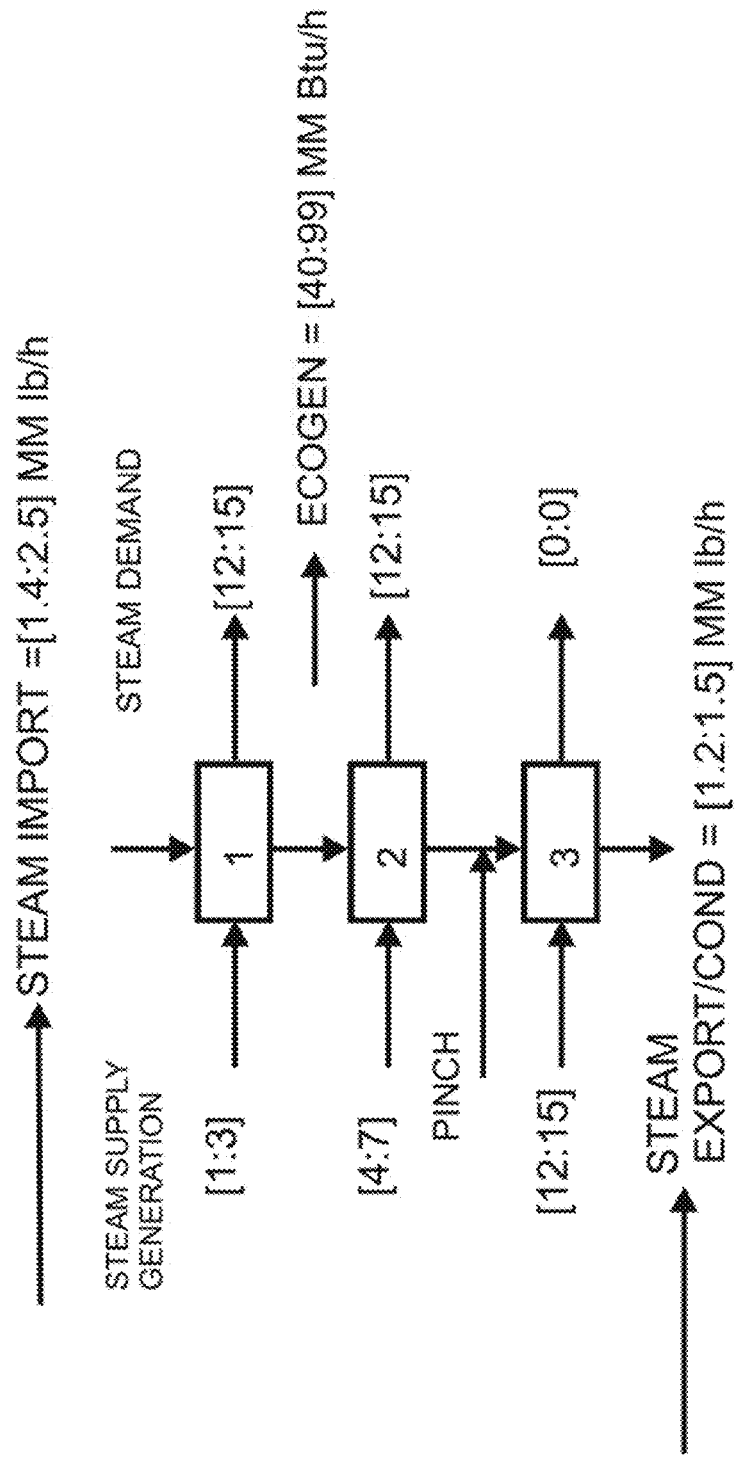
FIG. 10 is a schematic flow diagram illustrating application of a collapsing algorithm to determine the conditions that lead to the global minimum steam exportation capability (or waste) and the conditions that lead to the global minimum in-situ electricity cogeneration capability according to an embodiment of the present invention.
Figure 11:
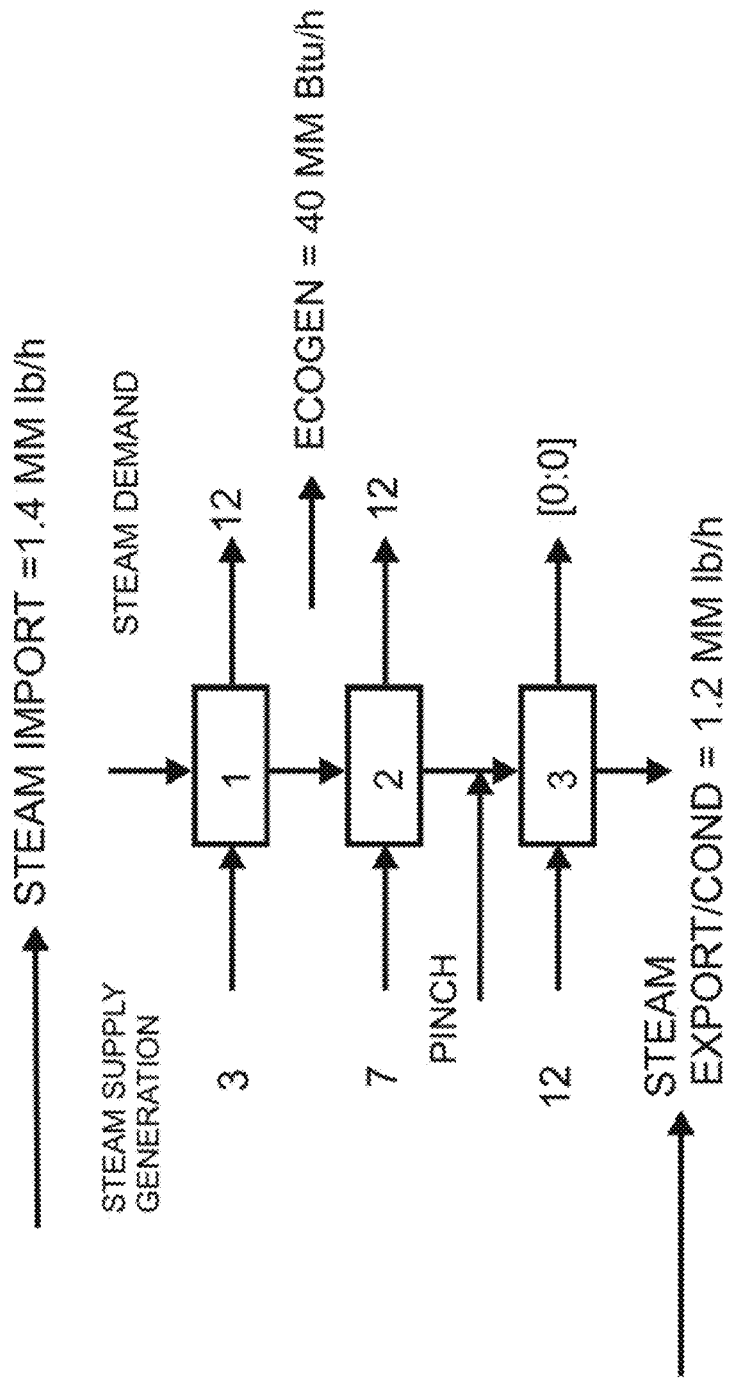
FIG. 11 is a schematic flow diagram illustrating resultant conditions that lead to the determined global minimum steam exportation capability (or waste) and the conditions that lead to the global minimum in-situ electricity cogeneration capability after application of a collapsing algorithm according to an embodiment of the present invention.

A decision maker selects the desired objective (block 111), and as shown in block 113, through use of the program product 51, for example, the corresponding process conditions that lead to the selected objective or objectives (block 113) are returned or otherwise defined. FIGS. 10-11 illustrates determining the conditions that lead to the global minimum steam exportation capability (or waste) and the conditions that lead to the global minimum in-situ electricity cogeneration capability.

Figure 12:
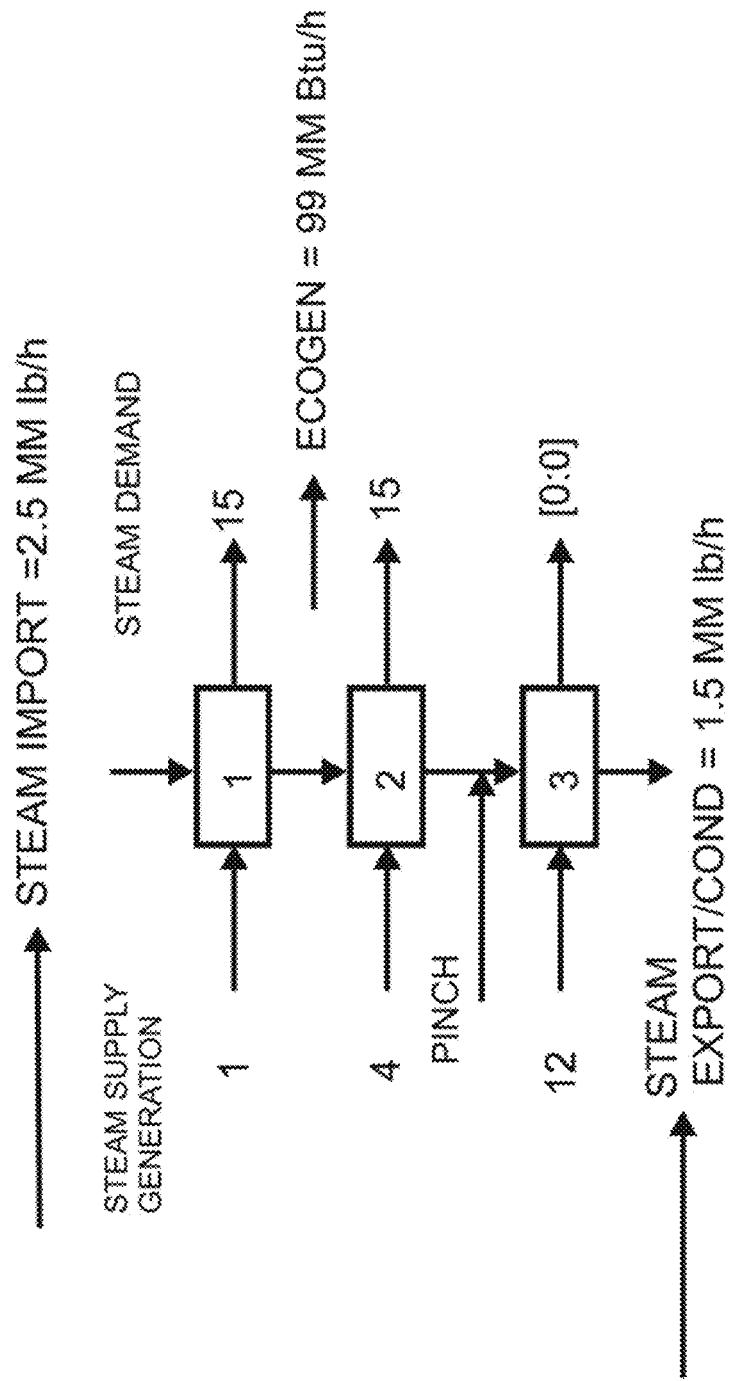
FIG. 12 is a schematic flow diagram illustrating determining conditions leading to multiple objectives, i.e., minimum steam importation subject to maximum cogeneration, according to an embodiment of the present invention.

As shown in blocks 115 and 117 (FIG. 2) and in FIG. 12, according to the illustrated embodiment(s) of the present invention, upon selection of a desired objective, subject to another one, conditions leading to the multiple objectives can be determined. As shown, for example, in FIG. 12, upon selection of global min STI=STI[L] subject to maximum ECOGEN, for example, using collapsing intervals algorithm, the steam supply/generation and steam demand for each header, along with the corresponding steam exportation capability, can be provided.

By way of further example, to obtain conditions that lead to minimum steam importation, STI subject to global minimum steam export/condensation/loss STE, the method steps/operations can include collapsing each of the [STs] below the pinched header at its lower bounds with each [STd] at its upper bound, and collapsing each [STs] above the pinched header at its upper bounds with each [STd] at its lower bounds, to thereby return or otherwise define the process conditions that render the desired multiple objectives. To obtain conditions that lead to minimum steam importation STI subject to global minimum steam condensation/loss STE and subject to maximum in-situ electricity generation [ECOGEN], the method steps/operations can include collapsing each [STs] below the pinched header at its lower bounds with each [STd] at its upper bound, and collapsing each [STs] above the pinched header at its lower bounds with each [STd] at its upper bounds, to thereby return or otherwise define the process conditions that render the desired multiple objectives. Further, various combinations of the other indices can be calculated using the formulas presented previously and the described process steps/operations.

Note, the program product 51 can beneficially have all the necessary calculations through blocks 107, 109, and 117, and can await decision maker selection as illustrated at either block 111 or 119 to thereby enhance the speed at which the calculated conditions can be displayed on the graphical user display 39.

Referring to FIGS. 13-18, according to an embodiment of the present invention, in its "Simulation Mode," the program product 51, as implemented by the illustrative method, for example, can allow the user to explore the effect of interval-based values of variables and parameters on system output, providing a value range of requirements and/or capabilities, respectively, due to such all-at-one-time variables and parameter changes. Particularly, responsive to input data (see, e.g., FIG. 14), a simulated output can be automatically generated for steam importation and exportation/condensation and electricity generation (see, e.g., FIGS. 15-18), along with electricity importation and exportation, fuel consumption, and water plant makeup, all without iteration, which can beneficially allow decision-makers to view the impact thereon due to the various process condition parameters entered therein.

Figure 13:
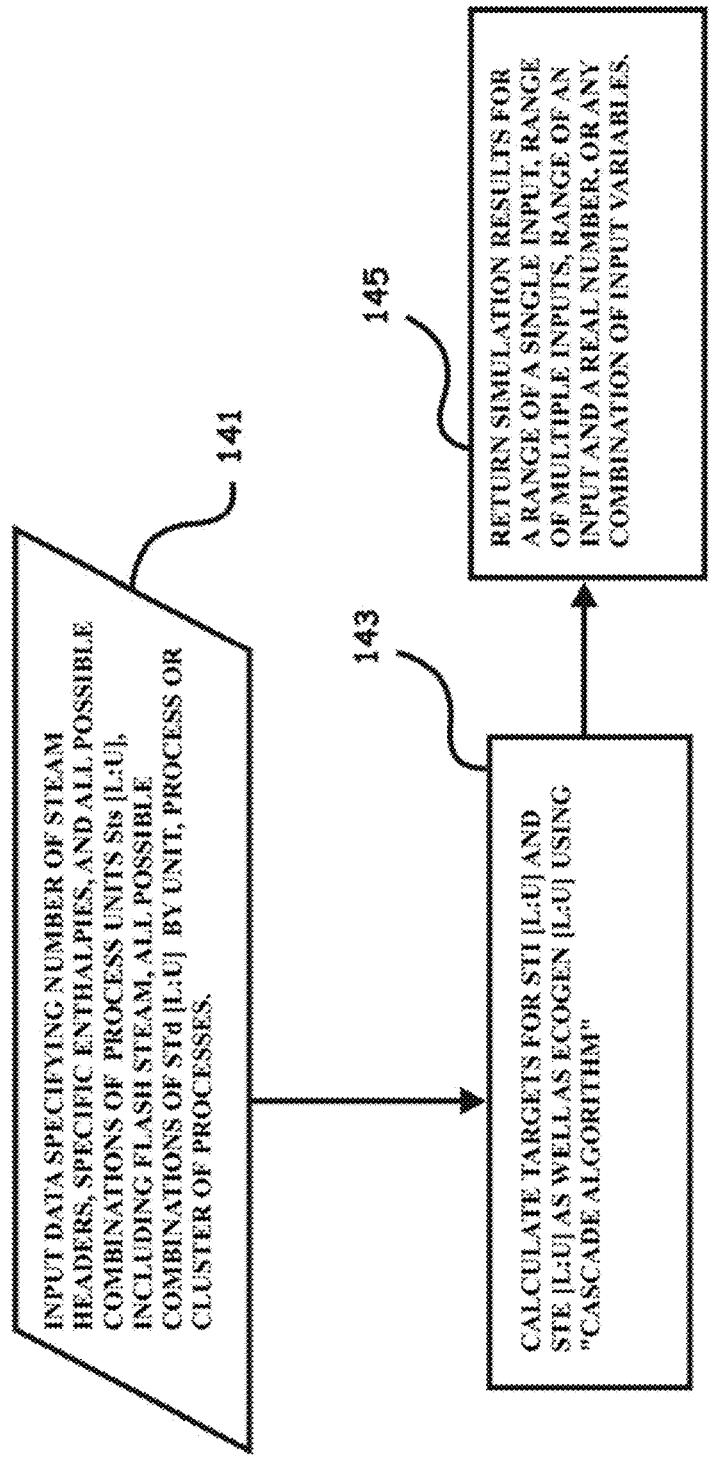
FIG. 13 is a schematic flow diagram of a simulation portion of a method for optimizing energy management for a site to determine a range of target requirement values according to an embodiment of the present invention.

Particularly, as shown in FIG. 13, block 141, and FIG. 14, as previously described with respect to block 103 (FIG. 2), according to the illustrated embodiment(s) of the present invention, either through user input or through automated systems, data specifying number of steam headers, each header's specific enthalpies, each possible combination of process units STs [L:U], including flash steam, and each possible combination of STd [L:U] by unit for a process or cluster of processes, is received. The data can be in form of real numbers, intervals and hybrid (both real numbers and intervals). Responsively, as shown in block 143, the various targets such as, for example, STI [L:U] and STE [L:U] as well as ECOGEN [L:U] using the cascade algorithm, are calculated or otherwise determined responsive to the received/retrieved input data. As shown in block 145, the simulation run results in a range of a single input, a range of multiple inputs, a range of input and a real number, and any possible significant combination thereof for display, as desired/requested by the decision maker.

Figure 15:
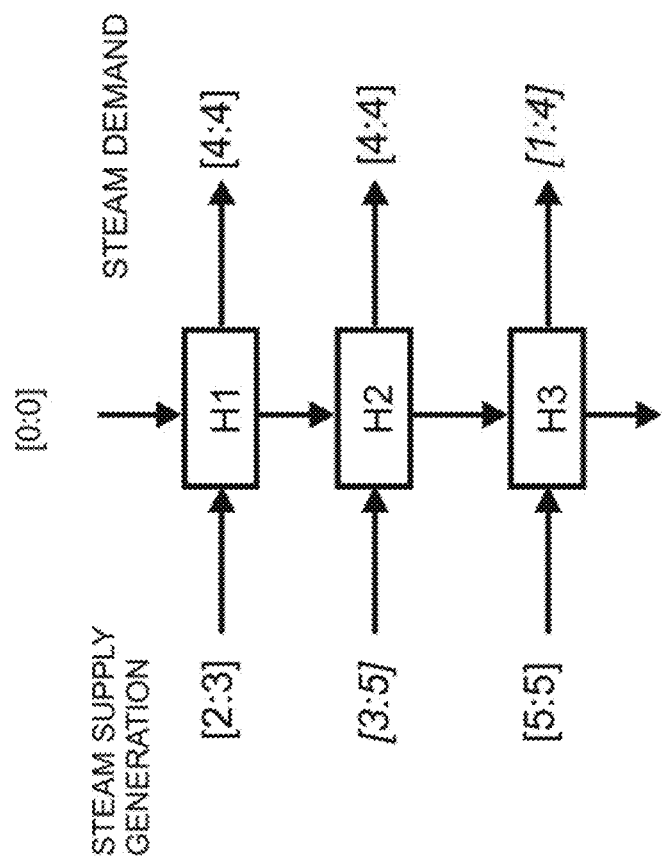
FIG. 15 is a schematic flow diagram illustrating the data entered in the graphical user interface shown in FIG. 14 represented in a combination of processes and pressures/temperature steps organized in descending order according to an embodiment of the present invention.
Figure 16:
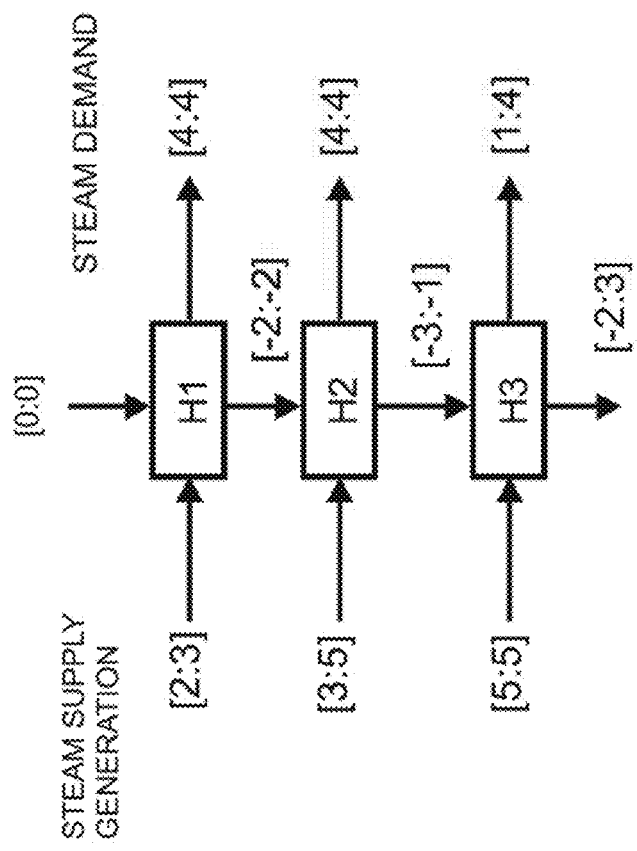
FIG. 16 is a schematic flow diagram illustrating a calculation of the steam export/waste for each pressure step according to an embodiment of the present invention.
Figure 17:
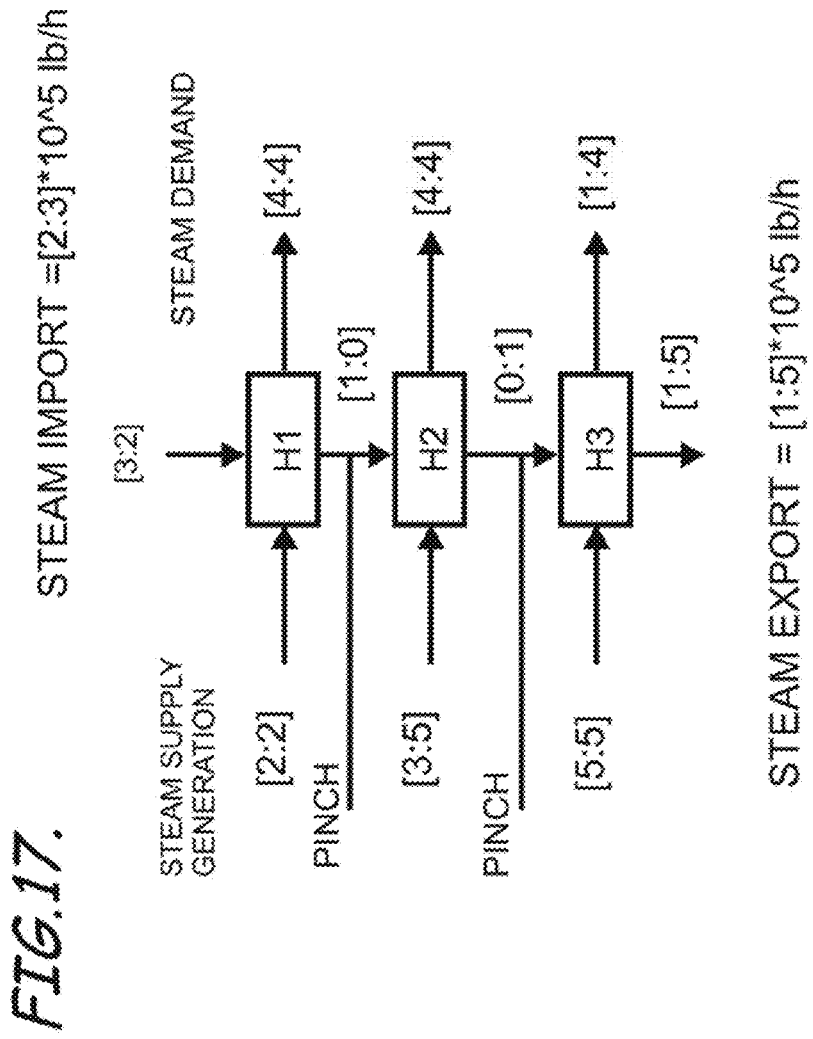
FIG. 17 is a schematic flow diagram illustrating utilization of the inverse of the pinch values to determine steam export/waste for the combination of the processes and pressure steps according to an embodiment of the present invention.
Figure 18:
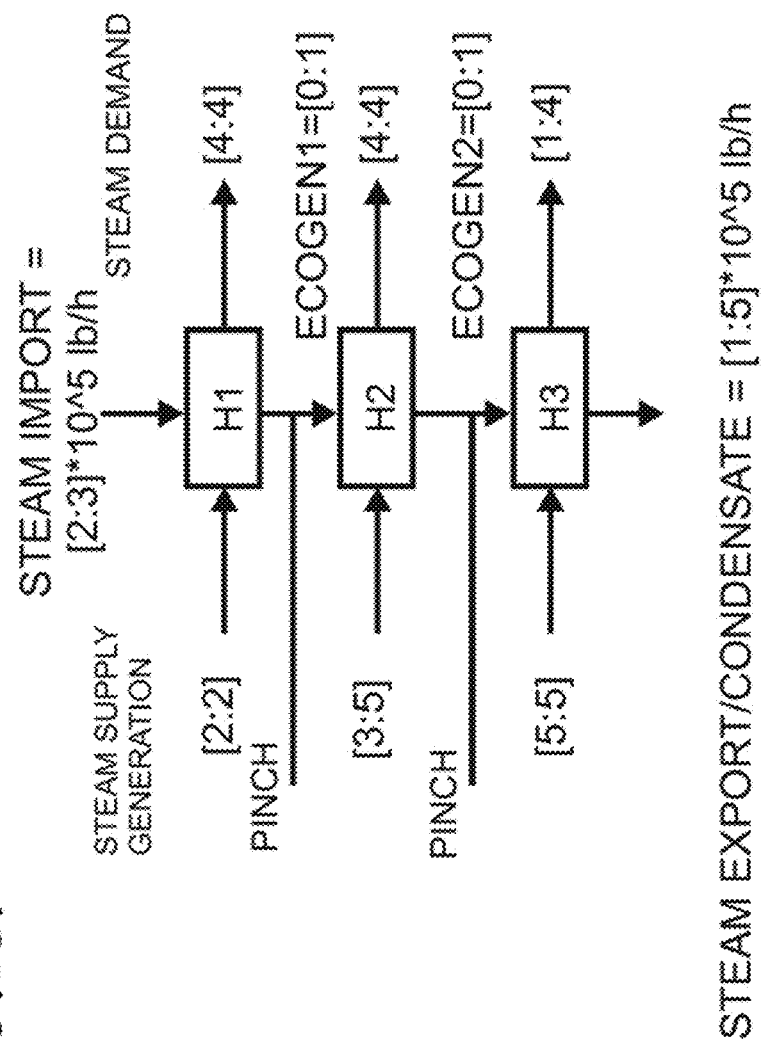
FIG. 18 is a schematic flow diagram illustrating determining in-situ electricity cogeneration capability for a combination of the processes and pressure steps according to an embodiment of the present invention.

As noted above, FIG. 14 illustrates a table for providing for user data entry, or for displaying data for a three-dimensional steam header system, entered via automated systems. FIGS. 15-18 provide an enhanced graphical illustration of the illustrative calculations. Particularly, FIG. 15 illustrates the data provided in the "steps" organized in descending order. FIG. 16 illustrates a calculation of the steam export/waste for each pressure step. FIG. 17 illustrates identifying where the "pinch(s)," as known and understood by those skilled in the art, occurs. FIG. 18, finally, illustrates determining the in-situ electricity cogeneration capability ECOGEN and steam export capability/condensate values STE for the combination of the processes and pressure steps.

In addition to providing a decision maker usable data describing the impact on steam importation STI, steam export/condensation STE, and impact on in situ electricity generation ECOGEN; by way of further example, the decision maker can also be provided with the impact on Plant Electricity Import (ELECIMP), impact on Plant Electricity Export (ELECEXP), impact on Fuel Consumption (FUEL- CONSUM), and impact on Plant Water Make-up (WTR-MAKE), for example, using, e.g., the following formulas:

[ELECIMP]=[ELECD]−[ECOGEN],

[ELECEXP]=[ECOGEN]−[ELECD],

[FUELCONSUM]={[STI]*H1/[BLREFF]*[FHV]},

[CONDRTRN]=[0.8:1]*{[STD]+[STE]}, and

[WTRMAKE]=[1:1]−[CONDRTRN].

Figure 19:
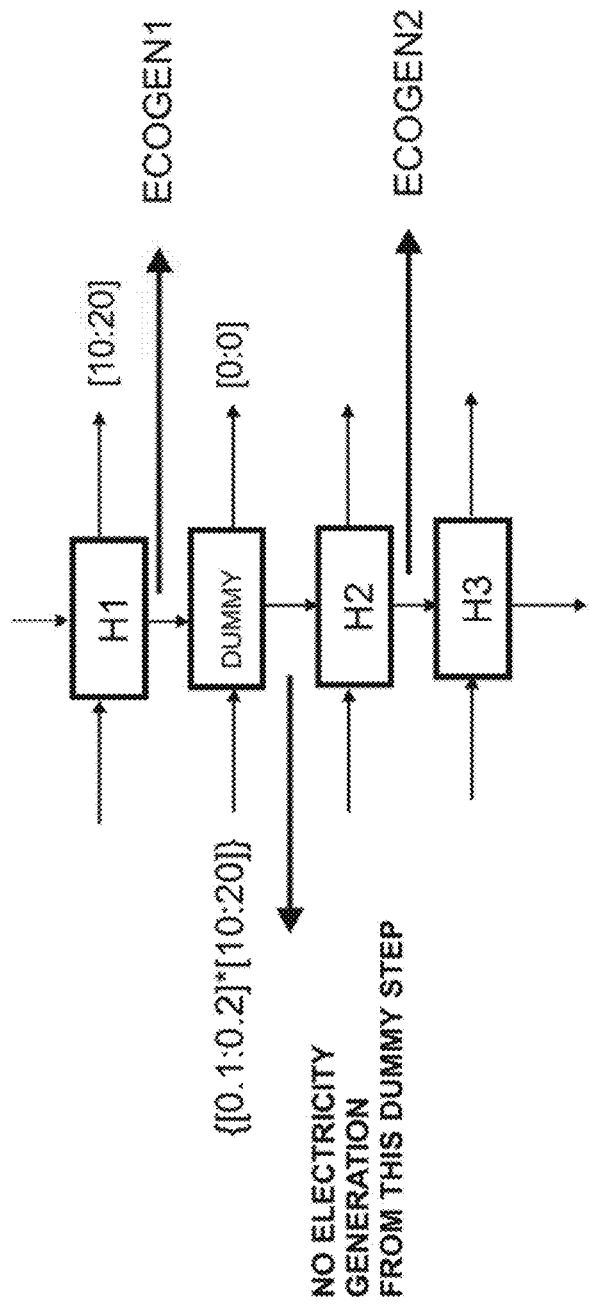
FIG. 19 is a schematic flow diagram illustrating application of a dummy steam step to account for condensate flashing (flash steam) according to an embodiment of the present invention.

As noted previously, the above described method steps/operations associated with the program product 51, can include provisions for dealing with handling flash steam. Flash-steam is a steam produced from the flashing of high pressure condensate generated at higher pressure header(s) and fed to lower pressure header. Such flash steam supply (FSTs) interval can be obtained from the condensate interval multiplied by [e1], where [e1] is a fraction interval that represents the fraction of condensate that is flashed to steam from condensate flash drum. As noted previously, this FSTs can be fed into a dummy pressure step as shown in FIG. 19. According to an embodiment of the present invention, this dummy pressure step is a "step" where electricity is not generated from its output, as is the case in the illustrated cascade algorithm.

FIG. 19 provides a graphical illustration for handling condensate flashing (flash steam). According to such illustrated embodiment of the present invention, as noted above, such high pressure condensate obtained from condensation of process heating steam can be flashed in flash drums (where little steam is extracted from the condensate) and fed to the lower pressure header. To account for this steam supply component: condensate from higher pressure headers (process heating steam demand, e.g., by process #1 (FIG. 14)) is multiplied by an interval called [FLASHSTM] that represents a fraction equal to steam produced/condensate flashed, [FLASHSTM]=[0.1:0.2]. Note, this fraction is user defined according to the illustrated embodiment of the present invention. Note also, the purpose of the "dummy step" is to enable using the main algorithm in calculating the steam balance, as such, the output of this dummy step is not used for calculating ECOGEN.

Figure 20:
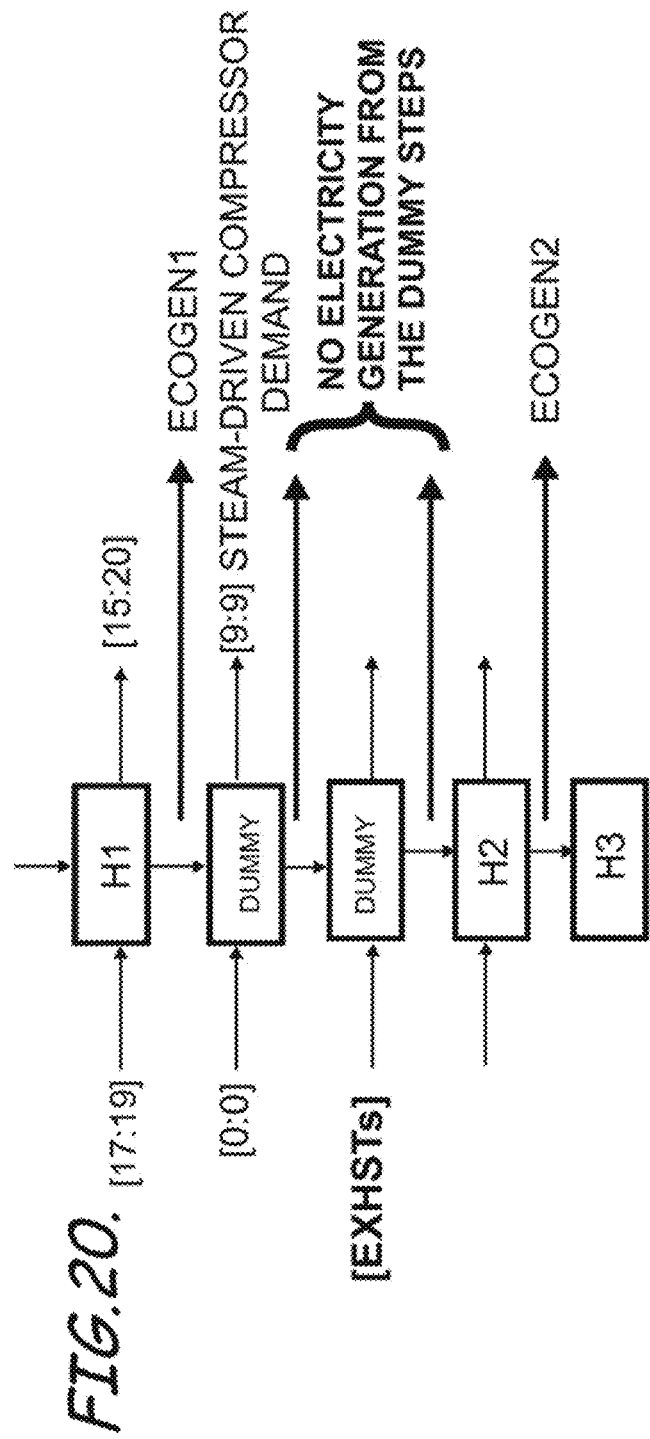
FIG. 20 is a schematic flow diagram illustrating application of a dummy steam step to account for steam-driven equipment according to an embodiment of the present invention.

As perhaps best shown in FIG. 20, the handling of steam driven equipment exhaust also is provided for according to an embodiment of the present invention. Steam-Driven equipment exhaust is a steam used for the operation of large compressors and pumps, which is then fed to lower pressure header. For flexibility reasons, according to an embodiment of the program products 51, each equipment (q) such as a turbine, pump, etc., that uses steam for operation is assigned a dummy pressure step with [0.0:0.0] input steam supply ([STs]) and an equipment demand interval of [STd]. That is, a dummy header is specified or created for each steam-driven equipment. Exhaust steam produced from such equipment is a supply (EXHSTs) interval. This supply interval is obtained from the equipment demand interval ([STd]) multiplied by [eq], where [eq] is a fraction interval that represents the fraction of steam exhaust produced after operating equipment (q). In this example, [EXHSTs]=[eq]*[9:9]. The [EXHSTs] is also fed into a dummy pressure step as shown in FIG. 20. The dummy pressure step is a step where electricity is not generated from its output as is the case in the cascade algorithm.

Figure 21:
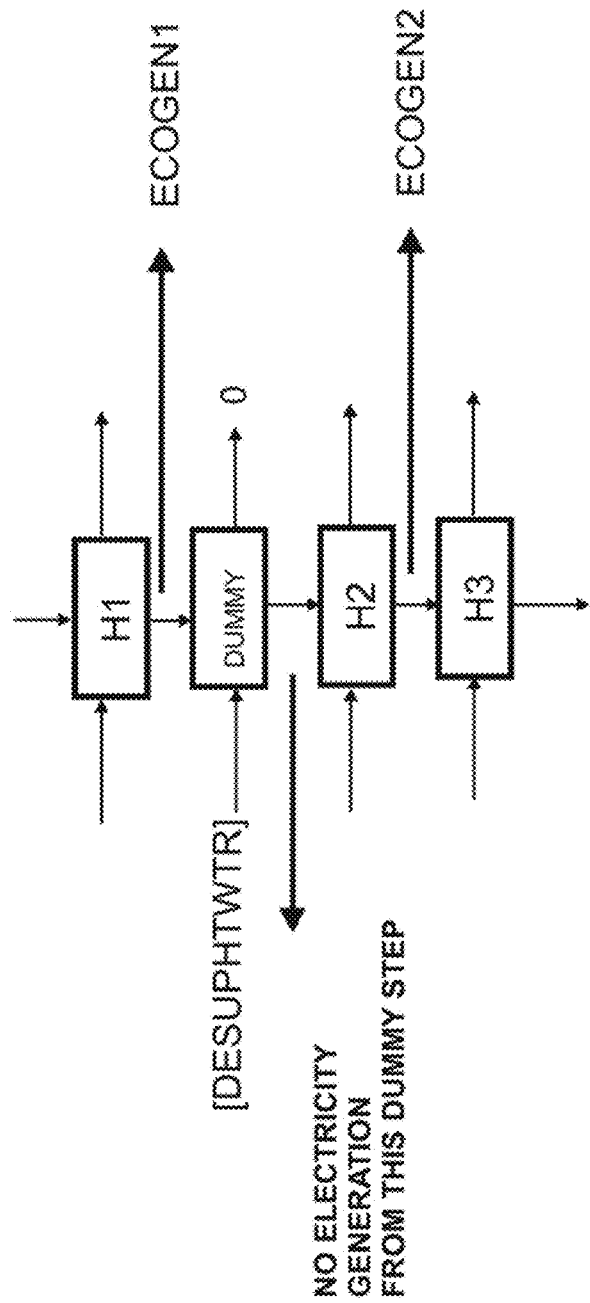
FIGS. 21-25 are a series of schematic flow diagrams illustrating application of a pair of dummy steam steps to account for de-superheating water used at let-down stations according to an embodiment of the present invention.

As shown in FIG. 21, the handling of steam let-down stations/steam de-superheating is also provided for, according to an embodiment of the present invention. In many cases, the de-superheating water used at the let-down stations is trivial and can be ignored without affecting the accuracy of the [STI]. To eliminate any inaccuracy, however, the calculation of [STI] can be performed by first using or employing the main cascade algorithm. A "trimming" LP formulation is used to correct or otherwise compensate for the inaccuracy, and a dummy step is used to keep consistency in the calculation of ECOGEN.

In the noncogeneration mode where steam let-downs are occurring using a known or unknown quantity of water for de-superheating, a new source of steam supply is added and only local minimum and maximum for steam import and export are obtained from the cogeneration mode calculations, above. These local minimum and maximum are then corrected to obtain the global values, since the global minimum of steam importation obtained for boilers is generally less optimistic. That is, the determined value is generally greater than the global minimum due to water injection used in de-superheating. Such correction can be conducted through an optimization formulation that minimizes "Boilers Steam" importation subject to mass balance equation for each pressure step, and mass and heat balance equations for each point of water injection, and through use of non-negativity constraints. That is, the global minimum steam importation STI [L] can be calculated using the following formulation:

$STI+STs_1-STd_1 \le 0.0,$ $S_1in+W_1-S_1out=0.0,$ $S_1out+STs_2-STd_2=S_2in,$ $S_2in+W_2-S_2out=0.0,$ $S_2out+STs_3-STd_3=S_3in,$ $S_1in*H_1+W_1*H_W-S_1out*H_2=0.0,$ $S_2in*H_2+W_2*H_W-S_2out*H_3=0.0,$ $STI+W_1+W_2-STI\_local=0.0;$ where:
  $S_1$in is the steam input to let-down station # one,
  $S_2$in is the Steam input to let-down station # two,
  $W_1$ is the Water input to let-down station # one,
  $W_2$ is the Water input to let-down station # two,
  $S_1$out is the Steam output from let-down station # one,
  $S_2$out is the Steam output from let-down station # two,
  $H_1$ is the Enthalpy of $S_1$in,
  $H_W$ is the Enthalpy of Water,
  $H_2$ is the Enthalpy of $S_1$out,
  $H_3$ is the Enthalpy of $S_2$out,
  $STs_1$ is the Steam supply to header # one (from in-situ process generation),
  $STs_2$ is the Steam supply to header 4 two (from in-situ process generation),
  $STs_3$ is the Steam supply to header # three (from in-situ process generation),
  $STd_1$ is the Steam demand from header # one,
  $STd_2$ is the Steam demand from header # two,
  $STd_3$ is the Steam demand from header # three, and
  STI_Local is the Local minimum of steam importation calculated without considering de-superheating water.

Figure 22:
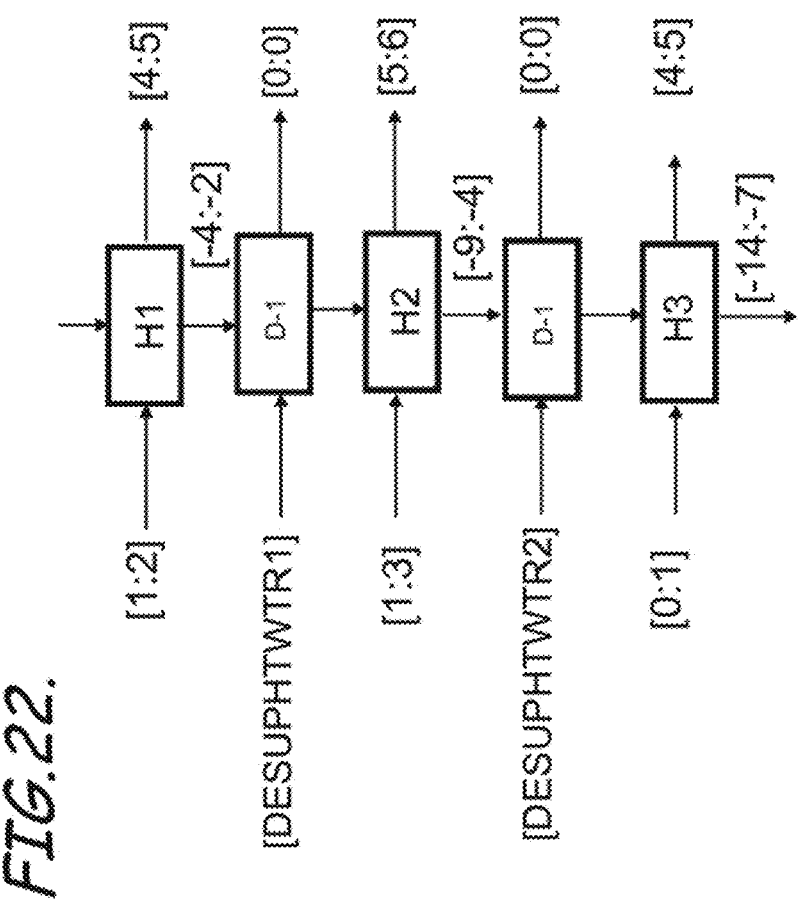
Figure 23:
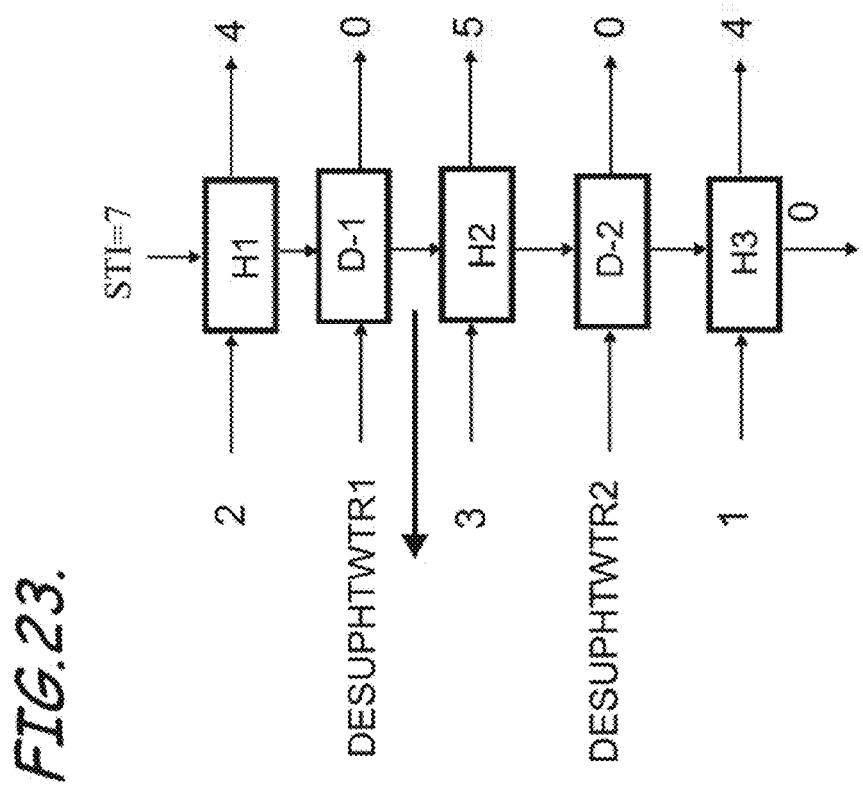
Figure 24:
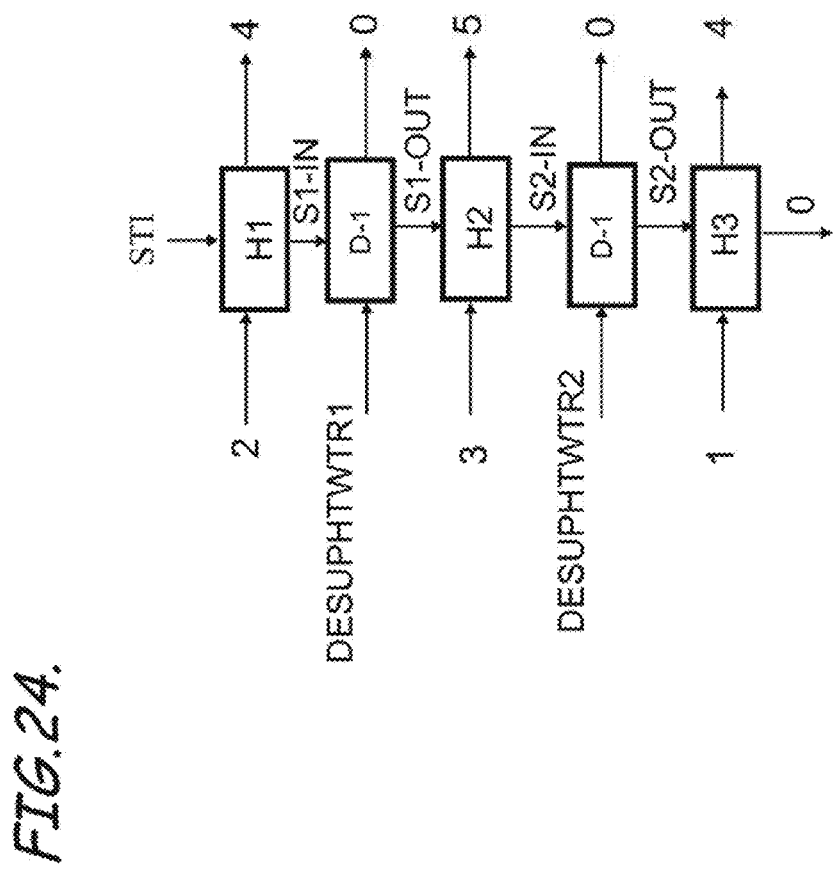
Figure 25:
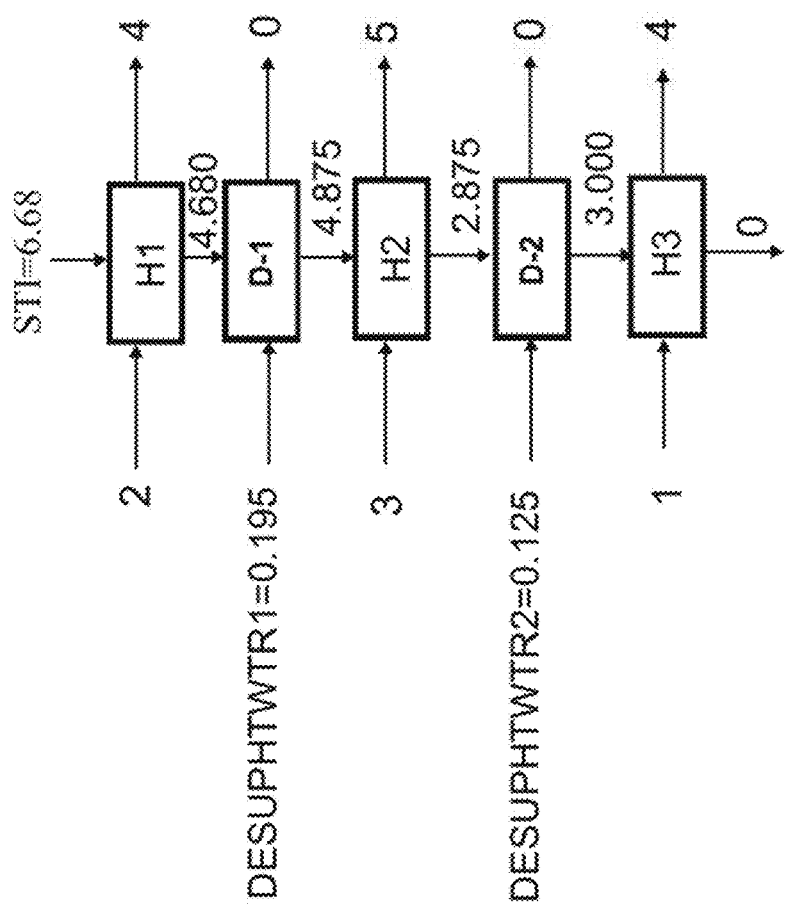

FIG. 22 illustrates an example of a three steam header system where de-superheating water is used at two locations. FIG. 23 illustrates the result of the cascade algorithm followed by the interval collapsing algorithm. Since this solution ignores the de-superheating water quantities, the calculated global minimum steam importation requirement STI [L] can be expected to be slightly higher than actual. In order to find the exact value, the above-identified LP formulation can be utilized. FIG. 24 illustrates a graphic example of LP formulation for the exemplary three steam header system using user/automated systems supplied numerical values for specific enthalpy for the three headers ($H_1$, $H_2$, $H_3$), and the water enthalpy ($H_W$), and FIG. 25 illustrates the corresponding result of the LP formulation.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium storing a set of instructions in a variety of forms for execution on a processor, processors, or the like, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and certain types of transmission type media such as, for example, digital and analog communication links capable of storing the set of instructions. For example, such media can include both operating instructions and operations instructions described with respect to program product 51 and computer executable embodiments of the method steps, described above.

Various embodiments of the present invention functioning in the "Targeting Mode," can advantageously define/determine, for a process or cluster of processes and without iteration, the global minimum or maximum steam generation requirements for mass and heating purposes, fuel generation requirements, in-situ steam generation requirements, steam export capabilities, boiler feedwater makeup requirements, steam de-superheating water requirements, steam importation requirements, steam condensation capabilities, in-situ electricity generation capabilities, electricity importation requirements, and electricity export capabilities, for example, due to each possible combination of process condition modifications and/or due to each possible combination of process disturbances and uncertainty ("single objective mode"), or subject to other desired objective(s) due to each possible combination of process condition modifications and/or due to each possible combination of process disturbances and uncertainty ("multi-objective mode").

Various embodiments of the present invention functioning in the "Find Solution Mode," can advantageously define/determine, for a process or cluster of processes, the supply and demand conditions to attain the minimum or maximum steam generation requirements for mass and heating purposes, fuel generation requirements, in-situ steam generation requirements, steam export capabilities, boiler feedwater makeup requirements, steam de-superheating water requirements, steam importation requirements, steam condensation capabilities, in-situ electricity generation capabilities, electricity importation requirements, and electricity export capabilities, for example, due to each possible combination of process condition modifications and/or due to each possible combination of process disturbances and uncertainty ("single objective mode"), or subject to other desired objective(s) due to each possible combination of process condition modifications and/or due to each possible combination of process disturbances and uncertainty ("multi-objective mode").

Various embodiments of the present invention functioning in the "Simulation Mode," can advantageously define, for a process or cluster of processes, a range of steam generation requirements for mass and heating purposes, fuel generation requirements, in-situ steam generation requirements, steam export capabilities, boiler feedwater makeup requirements, steam de-superheating water requirements, steam importation requirements, steam condensation capabilities, in-situ electricity generation capabilities, electricity importation requirements, and electricity export capabilities, for example, due to such all-at-one-time variables and parameter changes.

This application is related to U.S. Patent Application No. 61/171,030, filed Apr. 20, 2009, titled "System, Program Product, and Related Methods for Global Targeting of Process Utilities Under Varying Conditions," U.S. Patent Application No. 61/172,698, filed Apr. 24, 2009, titled "System Program Product, and Related Methods for Global Targeting of Process Utilities Under Varying Conditions," U.S. Patent Application No. 61/207,874, filed Jun. 6, 2008, titled "System, Program Product, and Related Methods for Global Targeting of Process Utilities Under Varying Conditions," U.S. patent application Ser. No. 11/768,084, filed Jun. 25, 2007, titled "System, Method, and Program Product for Targeting an Optimal Driving Force Distribution in Energy Recovery Systems," and U.S. Patent Application No. 60/816,234, filed Jun. 23, 2006, titled "Method and Program Product for Targeting and Optimal Driving Force Distribution in Energy Recovery Systems," each incorporated herein by reference in their entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, reference throughout this specification has been made to the program product 51 receiving a set of a range of attribute values for each attribute of each substantial process unit (resource stream) for each process or cluster of processes. One skilled in the art, however, should appreciate that other configurations and implementations of the program product and steam resource modeling are envisioned and the reference to the above throughout this specification should in no way be seen as limiting. Those skilled in the art should appreciate that other implementations or aspects of the technology developed are also envisioned. Further, the calculation engine incorporated in the program product can also be deliverable as a separate component of the invention as it can be utilized by others to develop their own program product. The principles, exemplary embodiments, and modes of operation of the present invention described in the foregoing specification should not to be construed as limited to the particular forms or embodiments disclosed, since these are regarded as illustrative rather than restrictive.

That claimed is:

1. A system to optimize energy management for a site including a combined steam heat and electrical power system having a plurality of process units, the system comprising:
an energy modeling computer having a processor, and memory coupled to the processor to store software therein; and
energy modeling program code stored in the memory of the energy modeling computer to optimize energy management, the program code including instructions that when executed by the energy modeling computer, cause the computer to perform the operations of:

receiving data indicating a potential range of steam supply values and data indicating a potential range of steam demand values for each of a plurality of process units at each of one or more of a plurality of steam pressure levels, collectively defining interval input data, the potential range of steam supply values describing supply or generation boundaries for each of the respective plurality of process units, the potential range of steam demand values describing demand boundaries for each of the respective plurality of process units, the respective potential range of steam supply values and the potential range of steam demand values for each of the plurality of process units each representing boundaries defined by each significantly potential combination of process condition modifications and each significantly potential combination of process disturbances and uncertainty for the respective plurality of process units of the combined steam heat and electrical power system, and determining a plurality of global steam targets along with a plurality of global electricity targets using a cascade algorithm responsive to the interval input data, the global steam targets being global to the collective plurality of process units and being unconstrained by the plurality of global electricity targets or other global steam process or utility targets, the plurality of global steam targets comprising: a global minimum steam importation requirement, a global maximum steam importation requirement, a global minimum steam exportation capability, and a global maximum steam exportation capability, the plurality of global electricity targets comprising a global minimum electricity cogeneration capability and a global maximum electricity cogeneration capability, the operation of determining including the operation of applying the potential range of steam supply values and the potential range of steam demand values as input values to the cascade algorithm to thereby determine the plurality of global steam targets, the cascade algorithm employed to determine surplus and deficit steam boundary values between each of the plurality of steam pressure levels and the global minimum and maximum steam importation requirements and the global minimum and maximum steam exportation capabilities, the cascade algorithm cascading surplus steam of each of the plurality of steam pressure levels from a higher steam pressure level to a lower steam pressure level, the global minimum and maximum steam importation requirements determined from the cascade algorithm and describing range boundaries of steam deficit across the plurality of cascaded steam headers and represented at a highest of the steam pressure levels, the global minimum and maximum steam exportation capabilities determined from the cascade algorithm and describing range boundaries of steam surplus across the plurality of cascaded steam headers and represented at a lowest of the steam pressure levels.

2. A system as defined in claim 1, wherein the operations further comprise:
receiving electricity demand interval data;
receiving boiler efficiency interval data; and
determining the following global energy targets:
a global minimum fuel consumption requirement,
a global maximum fuel consumption requirement,
a global minimum boiler feedwater water makeup requirement,
a global maximum boiler feedwater water makeup requirement,
a global minimum electricity importation requirement,
a global maximum electricity importation requirement,
a global minimum electricity export capability, and
a global maximum electricity export capability.

3. A system as defined in claim 1,
wherein the global minimum steam importation requirement and global maximum steam importation requirement form a global steam importation interval;
wherein the global minimum steam exportation capability and global maximum steam exportation capability form a global steam exportation interval;
wherein the global minimum electricity cogeneration capability and global maximum electricity cogeneration capability form a global electricity cogeneration interval; and
wherein the operations further comprise:
determining a global steam exportation capability and a global electricity cogeneration capability coinciding with the global minimum steam importation requirement responsive to selection thereof and responsive to application of an intervals collapsing algorithm,
determining a global steam importation requirement and a global electricity cogeneration capability coinciding with the global minimum steam exportation capability responsive to selection thereof and responsive to application of an intervals collapsing algorithm, and
determining process conditions that render one or more of the determined global targets defining one or more desired objectives responsive to user selection of the one or more desired objectives respectively and responsive to application of an intervals collapsing algorithm.

4. A system as defined in claim 1, wherein the operations further comprise:
determining a plurality of global minimum energy targets defining a plurality of desired objectives, a first of the plurality of desired objectives subject to a second of the plurality of desired objectives and subject to at least one selected global maximum energy target; and
determining process conditions that render at least a subset of the plurality of desired objectives responsive to user selection thereof, and responsive to application of an intervals collapsing algorithm.

5. A system as defined in claim 1,
wherein the operation of determining the plurality of global steam targets along with the plurality of global electricity targets using a cascade algorithm includes determining a plurality of energy target intervals for a plurality of energy utilities; and
wherein the operation of determining the plurality of energy target intervals includes the following operations:
determining the global minimum and maximum steam importation requirements interval responsive to a predetermined enthalpy value, a predetermined steam supply capability, and a predetermined steam demand requirement for each of a plurality of steam headers, and
determining the global minimum and maximum steam exportation capabilities interval and global minimum and maximum electricity cogeneration capabilities interval responsive to application of the cascade algorithm; and
wherein the operations further comprise:
determining a discrete value for one or more of the global steam or electricity targets responsive to the operation of determining the plurality of energy target intervals.

6. A system to optimize energy management for a site including a combined steam heat and electrical power system having a plurality of process units, the system comprising:
an energy modeling computer having a processor, and memory coupled to the processor to store software therein; and
energy modeling program code stored in the memory of the energy modeling computer to optimize energy management, the program code including instructions that when executed by the energy modeling computer, cause the computer to perform the operations of:
receiving data indicating a number of steam headers, and data indicating a potential range of steam supply values and data indicating a potential range of steam demand values for each of a plurality of process units, collectively defining input data, and
determining a plurality of global steam targets along with a plurality of global electricity targets using a cascade algorithm and responsive to the input data, the plurality of global steam targets comprising: a global minimum steam importation requirement, a global maximum steam importation requirement, a global minimum steam exportation capability, and a global maximum steam exportation capability, the plurality of global electricity targets comprising a global minimum electricity cogeneration capability and a global maximum electricity cogeneration capability;
wherein the operation of determining the plurality of global steam targets along with the plurality of global electricity targets using the cascade algorithm including the operation of applying the potential range of steam supply values and the potential range of steam demand values to the cascade algorithm; and
wherein the global minimum steam importation requirement and global maximum steam importation requirement form a steam importation interval (STI) determined according to the following calculation:

$$STI = [STI(\text{minimum}), STI(\text{maximum})];$$

wherein:
STI(minimum)=ABS Min{Min[$ST_S^{high\_output}$], 0.0},
STI(maximum)=ABS Min{Min[$ST_S^{low\_output}$], 0.0},
S=1, 2, ..., N,
N is a total number of steam headers,
D is a total number of dummy headers,
N+D is a total number of pressure steps, and
ABS is the absolute of the value between brackets;
wherein:

$$ST_s^{high\_output} = ST_{s-1}^{high\_output} + ST_s^{high\_Surplus},$$

$$ST_s^{low\_output} = ST_{s-1}^{low\_output} + ST_s^{low\_Surplus},$$

$$ST_s^{high\_surplus} = \left(\sum_{k=1}^{n_S} STs_k^{high} - \sum_{j=1}^{m_S} = STd_j^{low}\right), \text{ and}$$

$$ST_s^{low\_surplus} = \left(\sum_{k=1}^{n_S} STs_k^{low} - \sum_{j=1}^{m_S} = STd_j^{high}\right);$$

wherein:
$n_S$ is the number of steam supply sources,
$m_S$ is the number of steam demand sinks represented in the $S^{th}$ pressure step,
$ST_0^{high\_output}=0.0$, and
$ST_0^{low\_output}=0.0$; and
wherein:
$ST_{S\_k}^{low}$: is the low value of a steam supply flowrate term,
$ST_{S\_k}^{high}$: is the high value of the steam supply flowrate term,
$ST_{d\_j}^{low}$: is the low value of a steam demand flowrate term, and
$ST_{d\_j}^{high}$: is the high value of the steam demand flowrate term.

7. A system as defined in claim 6,
wherein the global minimum steam exportation capability is collectively defined by one or more of the following: global minimum steam export, vent, and condensation;
wherein the global maximum steam exportation capability is collectively defined by one or more of the following: global maximum steam export, vent, and condensation; and
wherein the global minimum steam exportation capability and global maximum steam exportation capability form a steam exportation interval (STE) determined according to the following calculation:

$$STE = [STE(\text{minimum}), STE(\text{maximum})];$$

wherein:
STE(minimum)=ABS Min{Min[$ST_S^{high\_output}$], 0.0}, and
STE(maximum)=ABS Min{Min[$ST_S^{low\_output}$], 0.0};
wherein:
$ST_0^{low\_output}$=ZSTI(maximum),
$ST_0^{high\_output}$=ZSTI(minimum),
ZSTI(minimum)=ABS Min{Min[$ST_S^{high\_output}$], 0.0}, and
ZSTI(maximum)=ABS Min{Min[$ST_S^{low\_output}$], 0.0};
and
wherein:

$$ST_s^{high\_output} = ST_{s-1}^{high\_output} + ST_s^{high\_Surplus},$$

$$ST_s^{low\_output} = ST_{s-1}^{low\_output} + ST_s^{low\_Surplus},$$

$$ST_s^{high\_surplus} = \left(\sum_{k=1}^{n_S} STs_k^{high} - \sum_{j=1}^{m_S} = STd_j^{low}\right), \text{ and}$$

$$ST_s^{low\_surplus} = \left(\sum_{k=1}^{n_S} STs_k^{low} - \sum_{j=1}^{m_S} = STd_j^{high}\right).$$

8. A system as defined in claim 6,
wherein the global minimum electricity cogeneration capability and the global maximum electricity cogeneration capability form an electricity cogeneration capability interval (ECOGEN) determined according to the following calculation:

$$ECOGEN = [(ECOGEN\_low), (ECOGEN\_high)];$$

wherein:

$$(\text{ECOGEN\_low}) = \sum_{s=1}^{N+D} (\text{ECOGEN\_low})s, \text{ and}$$

$$(\text{ECOGEN\_high}) = \sum_{s=1}^{N+D} (\text{ECOGEN\_high})s;$$

wherein:
(ECOGEN\_low)$_s$=ST$_S^{low\_output}$*(Efficiency\_low)*
   ($H_{s-1}-H_s$), and
(ECOGEN\_High)$_s$ST$_S^{high\_output}$*(Efficiency\_high)*
   ($H_{s-1}-H_s$); and wherein:
($H_{s-1}-H_s$) is a specific enthalpy difference between upper pressure and lower pressure steps,
(Efficiency\_low) is an arbitrary lower bound number for electricity generation efficiency, and
(Efficiency\_high) is an arbitrary upper bound number for electricity generation efficiency.

9. A system as defined in claim 6,
wherein the global minimum steam importation requirement and global maximum steam importation requirement form a steam importation interval; and
wherein the operation of determining the plurality of global steam targets along with the plurality of global electricity targets using a cascade algorithm includes determining the steam importation interval along with the plurality of global electricity targets using a plurality of pressure steps corresponding to a number of steam headers and using a plurality of dummy pressure steps.

10. A system as defined in claim 9, wherein the combined steam heat and electrical power system includes one or more steam-turbines used as a process driver, and wherein the operations further comprise:
assigning two dummy pressure steps to each steam-turbine used as a process driver, a first dummy pressure step being assigned to steam demand with zero supply and a second dummy pressure step being assigned to steam supply with zero demand.

11. A non-transitory computer readable medium comprising a program code for optimizing energy management for a site including a combined steam heat and electrical power system having a plurality of process units, the program code comprising a set of instructions that when executed by a computer, cause the computer to perform the operations of:
receiving data indicating a potential range of steam supply values and data indicating a potential range of steam demand values for each of a plurality of process units at each of one or more of a plurality of steam pressure levels, collectively defining interval input data, the potential range of steam supply values describing supply or generation boundaries for each of the respective plurality of process units, the potential range of steam demand values describing demand boundaries for each of the respective plurality of process units, the respective potential range of steam supply values and the potential range of steam demand values for each of the plurality of process units each representing boundaries defined by each significantly potential combination of process condition modifications and each significantly potential combination of process disturbances and uncertainty for the respective plurality of process units of the combined steam heat and electrical power system; and
determining at least one global steam target along with at least one global electricity target using a cascade algorithm responsive to the interval input data, the at least one global steam target being global to the collective plurality of process units and being unconstrained by the at least one global electricity target or other global steam process or utility targets, the operation comprising:
determining one or more of the following: a global minimum steam importation or exportation target along with at least one global electricity importation or exportation target and a global maximum steam importation or exportation target along with at least one global electricity importation or exportation target, and
applying the potential range of steam supply values and the potential range of steam demand values of each of the plurality of process units as input values to the cascade algorithm to thereby determine the at least one global steam target, the cascade algorithm employable to determine surplus and deficit steam boundary values between each of the plurality of steam pressure levels and the global minimum steam importation or exportation target and the global maximum steam importation or exportation target, the cascade algorithm cascading surplus steam of each of the plurality of steam pressure levels from a higher steam pressure level to a lower steam pressure level, the global minimum and maximum steam importation targets determinable from the cascade algorithm and describing range boundaries of steam deficit across the plurality of cascaded steam headers and represented at a highest of the steam pressure levels, the global minimum and maximum steam exportation targets determinable from the cascade algorithm and describing range boundaries of steam surplus across the plurality of cascaded steam headers and represented at a lowest of the steam pressure levels.

12. A non-transitory computer readable medium as defined in claim 11,
wherein the operation of determining at least one global steam target along with at least one global electricity target is performed for each of a plurality of discrete values throughout the potential range of steam supply values and a plurality of values throughout the potential range of steam demand values without enumeration.

13. A non-transitory computer readable medium as defined in claim 11,
wherein the input data for the plurality of process units account for each substantial steam supply source for the combined steam heat and electrical power system.

14. A non-transitory computer readable medium as defined in claim 11, wherein the operations further comprise:
determining a global minimum energy utility target for a first type of process or utility subject to a desired global maximum energy target for a second different type of process or utility.

15. A non-transitory computer readable medium as defined in claim 11, wherein the operations further comprise:
determining substantially discrete supply and demand conditions for each of the plurality of process units that render the at least one global steam target and the at least one global electricity target.

16. A non-transitory computer readable medium as defined in claim 15,
wherein the at least one global steam target includes at least one global minimum steam target; and wherein the operation of determining substantially discrete supply and demand conditions for each of the plurality of process units is performed for a first type of utility subject to at least one other desired global energy utility target objective for a second different type of utility.

17. A non-transitory computer readable medium as defined in claim 11,
wherein the at least one global steam target includes global minimum steam importation and global minimum steam vent, export, or condensation.

18. A non-transitory computer readable medium as defined in claim 11,
wherein the at least one global steam target includes global minimum steam importation; and
wherein the at least one global electricity target includes global minimum electricity cogeneration.

19. A non-transitory computer readable medium as defined in claim 11, wherein the operation of determining at least one global steam target along with at least one global electricity target using a cascade algorithm includes:
determining a plurality of global minimum energy utility targets including global minimum steam importation, global minimum steam vent, export, or condensation; and
determining a global minimum electricity cogeneration responsive to determining the global minimum steam importation.

20. A non-transitory computer readable medium as defined in claim 11, wherein the operations comprise determining each of the following:
a global minimum steam generation requirement for mass and heating purposes;
a global minimum fuel consumption requirement;
a global minimum in-situ steam generation requirement;
a global minimum steam export capability;
a global minimum boiler feedwater makeup;
a global minimum steam de-superheating water capability;
a global minimum steam importation requirement;
a global minimum steam condensation capability;
a global minimum in-situ electricity generation capability;
a global minimum electricity importation requirement; and
a global minimum electricity export capability.

21. A non-transitory computer readable medium as defined in claim 11, wherein the operation of determining at least one global steam target along with at least one global electricity target using a cascade algorithm includes performing the operations of:
determining a global steam exportation capability and a global electricity cogeneration capability coinciding with a global minimum steam importation requirement responsive to selection thereof and responsive to application of an intervals collapsing algorithm;
determining a global steam importation requirement and a global electricity cogeneration capability coinciding with a global minimum steam exportation capability responsive to selection thereof and responsive to application of an intervals collapsing algorithm; and
determining process conditions that render one or more of the determined global minimum targets defining one or more desired objectives responsive to user selection the one or more desired objectives respectively and responsive to application of an intervals collapsing algorithm.

22. A non-transitory computer readable medium as defined in claim 11, wherein the operations further comprise:
determining a plurality of global minimum energy targets defining a plurality of desired objectives, a first of the plurality of desired objectives subject to a second of the plurality of desired objectives and subject to at least one global maximum energy target; and
determining process conditions that render at least a subset of the plurality of desired objectives responsive to user selection thereof and responsive to application of an intervals collapsing algorithm.

23. A non-transitory computer readable medium as defined in claim 11,
wherein the at least one global steam target comprises a global minimum steam importation requirement, a global maximum steam importation requirement, a global minimum steam exportation capability, and a global maximum steam exportation capability;
wherein the at least one global electricity target comprises a global minimum electricity cogeneration capability and a global maximum electricity cogeneration capability;
wherein the operation of determining at least one global steam target along with at least one global electricity target using a cascade algorithm includes determining a plurality of energy target intervals; and
wherein the operation of determining a plurality of energy target intervals includes the following operations:
determining the global minimum and maximum steam importation requirements interval responsive to a predetermined enthalpy value, a predetermined steam supply capability, and a predetermined steam demand requirement for each of a plurality of steam headers, and
determining the global minimum and maximum steam exportation capabilities interval and global minimum and maximum electricity cogeneration capabilities interval responsive to application of the cascade algorithm.

24. A method for optimizing energy management for a site including a combined steam heat and electrical power system having a plurality of process units, the method comprising the steps of:
receiving, by a computer, data indicating a potential range of attribute values for a first operational attribute and data indicating a potential range of attribute values for a second operational attribute for each of a plurality of process units at each of one or more of a plurality of steam pressure levels, collectively defining interval input data, the potential range of values for the first operational attribute describing supply or generation boundaries for the respective plurality of process units, the potential range of values for the second operational attribute describing demand boundaries for the respective plurality of process units, the respective potential range of first operational attribute values and the potential range of second operational attribute values for each of the plurality of process units each representing boundaries defined by each significantly potential combination of process condition modifications and each significantly potential combination of process disturbances and uncertainty for the respective plurality of process units of the combined steam heat and electrical power system; and
determining, by a computer, at least one global steam target along with at least one global electricity target using a cascade algorithm responsive to the interval input data, the at least one global steam target being global to the collective plurality of process units and being unconstrained by the at least one global electricity target or other global steam process or utility targets, the operation comprising:

determining one or more of the following:
  a global minimum steam importation or exportation target along with at least one global electricity importation or exportation target, and
  a global maximum steam importation or exportation target along with at least one global electricity importation or exportation target, and
applying the potential range of attribute values for the first operational attribute and the potential range of attribute values for the second operational attribute of each of the plurality of process units as input values to the cascade algorithm to thereby determine the at least one global steam target, the cascade algorithm employable to determine surplus and deficit steam boundary values between each of the plurality of steam pressure levels and the global minimum steam importation or exportation target and the global maximum steam importation or exportation target, the cascade algorithm cascading surplus steam of each of the plurality of steam pressure levels from a higher steam pressure level to a lower steam pressure level, the global minimum and maximum steam importation target determinable from the cascade algorithm and describing range boundaries of steam deficit across the plurality of cascaded steam headers and represented at a highest of the steam pressure levels, the global minimum and maximum steam exportation target determinable from the cascade algorithm and describing range boundaries of steam surplus across the plurality of cascaded steam headers and represented at a lowest of the steam pressure levels.

25. A method as defined in claim 24,
wherein the step of determining at least one global steam target along with at least one global electricity target using a cascade algorithm is performed for each of a plurality of discrete values extending throughout the potential range of values for the first operational attribute and for each of a plurality of values extending throughout the potential range of values for the second operational attribute of each of the plurality of process units without enumeration.

26. A method as defined in claim 24,
wherein the input data for the plurality of process units account for each substantial steam supply source for the combined steam heat and electrical power system; and
wherein a plurality of resource streams embodying the plurality of process units comprise a corresponding plurality of steam headers for the site.

27. A method as defined in claim 24, further comprising the step of:
determining a global minimum energy utility target for a first type of process or utility subject to a desired global maximum energy target for a second different type of process or utility.

28. A method as defined in claim 24, further comprising the step of:
determining a plurality of global maximum energy targets.

29. A method as defined in claim 24, further comprising the step of:
determining substantially discrete supply and demand conditions for each of the plurality of process units that render the at least one global steam target and the at least one global electricity target.

30. A method as defined in claim 29,
wherein the at least one global steam target includes at least one global minimum steam target; and
wherein the step of determining substantially discrete supply and demand conditions for each of the plurality of process units is performed for a first type of utility subject to at least one other desired global energy utility target objective for a second different type of utility.

31. A method as defined in claim 24,
wherein the at least one global steam target includes global minimum steam importation and global minimum steam vent, export, or condensation.

32. A method as defined in claim 24,
wherein the at least one global steam target includes global minimum steam importation; and
wherein the at least one global electricity target includes global minimum electricity cogeneration.

33. A method as defined in claim 24, wherein the step of determining at least one global steam target along with at least one global electricity target using a cascade algorithm includes:
determining a plurality of global minimum energy utility targets including global minimum steam importation, global minimum steam vent, export, or condensation defining a global minimum exportation, and global minimum electricity cogeneration, the global minimum electricity cogeneration determined responsive to determining the global minimum steam importation.

34. A method as defined in claim 24, further comprising the steps of determining each of the following:
a global minimum steam generation requirement for mass and heating purposes;
a global minimum fuel consumption requirement;
a global minimum in-situ steam generation requirement;
a global minimum steam export capability;
a global minimum boiler feedwater makeup;
a global minimum steam de-superheating water capability;
a global minimum steam importation requirement;
a global minimum steam condensation capability;
a global minimum in-situ electricity generation capability;
a global minimum electricity importation requirement; and
a global minimum electricity export capability.

35. A method as defined in claim 24, further comprising the steps of:
determining a global steam exportation capability and a global electricity cogeneration capability coinciding with a global minimum steam importation requirement responsive to selection thereof and responsive to application of an intervals collapsing algorithm;
determining a global importation requirement and a global electricity cogeneration capability coinciding with a first determined global minimum steam exportation capability and responsive to application of an intervals collapsing algorithm; and
determining process conditions that render one or more of the determined global minimum targets defining one or more desired objectives responsive to user selection of the one or more desired objectives respectively and responsive to application of an intervals collapsing algorithm.

36. A method as defined in claim 24, further comprising the steps of:
determining a plurality of global minimum energy targets defining a plurality of desired objectives, a first of the plurality of desired objectives subject to a second of the plurality of desired objectives and subject to at least one global maximum electricity target; and
determining process conditions that render at least a subset of the plurality of desired objectives responsive to user selection thereof and responsive to application of an intervals collapsing algorithm.

37. A method as defined in claim 24,
   wherein the at least one global steam target comprises a global minimum steam importation requirement, a global maximum steam importation requirement, a global minimum steam exportation capability, and a global maximum steam exportation capability;
   wherein the at least one global electricity target comprises a global minimum electricity cogeneration capability and a global maximum electricity cogeneration capability;
   wherein the step of determining at least one global steam target along with at least one global electricity target using a cascade algorithm includes determining a plurality of energy target intervals; and
   wherein the step of determining a plurality of energy targets intervals includes the following steps:
      determining the global minimum and maximum steam importation requirements responsive to a predetermined enthalpy value, a predetermined steam supply capability, and a predetermined steam demand requirement for each of a plurality of steam headers, and
      determining the global minimum and maximum steam exportation capabilities and global minimum and maximum electricity cogeneration capabilities responsive to application of an intervals collapsing algorithm.

38. A method for optimizing energy management for a site including a combined steam heat and electrical power system having a plurality of process units, the method comprising the steps of:
   receiving, by a computer, data indicating a potential range of attribute values for a first operational attribute and data indicating a potential range of attribute values for a second operational attribute for each of a plurality of process units, collectively defining input data; and
   determining, by a computer, at least one global steam target along with at least one global electricity target using a cascade algorithm responsive to the input data;
   wherein the step of determining the at least one global steam target along with at least one global electricity target using the cascade algorithm includes the step of applying the potential range of attribute values for the first operational attribute and the potential range of attribute values for the second operational attribute of each of the plurality of process units to the cascade algorithm;
   wherein the at least one global steam target comprises both a global minimum steam importation requirement and a global maximum steam importation requirement; and
   wherein the global minimum steam importation requirement and global maximum steam importation requirement form a steam importation interval (STI) determined according to the following calculation:

$$STI = [STI(\text{minimum}), STI(\text{maximum})];$$

wherein:
   $STI(\text{minimum}) = ABS\ Min\{Min[ST_S^{high\_output}], 0.0\}$,
   $STI(\text{maximum}) = ABS\ Min\{Min[ST_S^{low\_output}], 0.0\}$,
   $S = 1, 2, \ldots, N$,
   N is a total number of steam headers,
   D is a total number of dummy headers,
   N+D is a total number of pressure steps, and
   ABS is the absolute of the value between brackets;

wherein:

$$ST_s^{high\_output} = ST_{s-1}^{high\_output} + ST_s^{high\_Surplus},$$

$$ST_s^{low\_output} = ST_{s-1}^{low\_output} + ST_s^{low\_Surplus},$$

$$ST_s^{high\_surplus} = \left(\sum_{k=1}^{n_s} STs_k^{high} - \sum_{j=1}^{m_s} = STd_j^{low}\right), \text{ and}$$

$$ST_s^{low\_surplus} = \left(\sum_{k=1}^{n_s} STs_k^{low} - \sum_{j=1}^{m_s} = STd_j^{high}\right);$$

wherein:
   $n_S$ is the number of steam supply sources,
   $m_S$ is the number of steam demand sinks represented in the $S^{th}$ pressure step,
   $ST_0^{high\_output} = 0.0$, and
   $ST_0^{low\_output} = 0.0$; and
wherein:
   $ST_{s\_k}^{low}$: is the low value of a steam supply flowrate term,
   $ST_{s\_k}^{high}$: is the high value of the steam supply flowrate term,
   $ST_{d\_j}^{low}$: is the low value of a steam demand flowrate term, and
   $ST_{d\_j}^{high}$: is the high value of the steam demand flowrate term.

39. A method as defined in claim 38,
   wherein the at least one global steam target comprises both a global minimum steam exportation capability and a global maximum steam exportation capability, the global minimum steam exportation capability being collectively defined by one or more of the following: global minimum steam export, vent, and condensation, the global maximum steam exportation capability being collectively defined by one or more of the following: a global maximum steam export, vent, and condensation; and
   wherein the global minimum steam exportation capability and global maximum steam exportation capability form a steam exportation interval (STE) determined according to the following calculation:

$$STE = [STE(\text{minimum}), STE(\text{maximum})];$$

wherein:
   $STE(\text{minimum}) = ABS\ Min\{Min[ST_S^{high\_output}], 0.0\}$, and
   $STE(\text{maximum}) = ABS\ Min\{Min[ST_S^{low\_output}]; 0.0\}$;
wherein:
   $ST_0^{low\_output} = ZSTI(\text{maximum})$,
   $ST_0^{high\_output} = ZSTI(\text{minimum})$,
   $ZSTI(\text{minimum}) = ABS\ Min\{Min[ST_S^{high\_output}], 0.0\}$, and
   $ZSTI(\text{maximum}) = ABS\ Min\{Min[ST_S^{low\_output}], 0.0\}$; and
wherein:

$$ST_s^{high\_output} = ST_{s-1}^{high\_output} + ST_s^{high\_Surplus},$$

$$ST_s^{low\_output} = ST_{s-1}^{low\_output} + ST_s^{low\_Surplus},$$

$$ST_s^{high\_surplus} = \left(\sum_{k=1}^{n_s} STs_k^{high} - \sum_{j=1}^{m_s} = STd_j^{low}\right), \text{ and}$$

$$ST_s^{low\_surplus} = \left(\sum_{k=1}^{n_s} STs_k^{low} - \sum_{j=1}^{m_s} = STd_j^{high}\right).$$

40. A method as defined in claim 38,
  wherein the at least one global electricity target comprises both a global minimum electricity cogeneration capability and a global maximum electricity cogeneration capability; and
  wherein the global minimum electricity cogeneration capability and global maximum electricity cogeneration capability form an electricity cogeneration interval (ECOGEN) determined according to the following calculation:

ECOGEN=[(ECOGEN_low), (ECOGEN_high)];

wherein:

$$(\text{ECOGEN\_low}) = \sum_{s=1}^{N+D} (\text{ECOGEN\_low})s, \text{ and}$$

$$(\text{ECOGEN\_high}) = \sum_{s=1}^{N+D} (\text{ECOGEN\_high})s;$$

wherein:
    $(\text{ECOGEN\_low})_s = ST_s^{low\_output} * (\text{Efficiency\_low}) * (H_{s-1} - H_s)$, and
    $(\text{ECOGEN\_High})_s ST_s^{high\_output} * (\text{Efficiency\_high}) * (H_{s-1} - H_s)$; and
  wherein:
    $(H_{s-1} - H_s)$ is a specific enthalpy difference between upper pressure and lower pressure steps,
    (Efficiency_low) is an arbitrary lower bound number for electricity generation efficiency, and
    (Efficiency_high) is an arbitrary upper bound number for electricity generation efficiency.

41. A method as defined in claim 40, further comprising the steps of:
  receiving electricity demand interval data;
  receiving boiler efficiency interval data; and
  determining the following global energy utility target requirements:
    a global minimum fuel consumption requirement,
    a global maximum fuel consumption requirement,
    a global minimum boiler feedwater water makeup requirement,
    a global maximum boiler feedwater water makeup requirement,
    a global minimum electricity importation requirement,
    a global maximum electricity importation requirement,
    a global minimum electricity export capability, and
    a global maximum electricity export capability.

42. A non-transitory computer readable medium comprising program code that is readable by a computer to optimize energy management for a site including a combined steam heat and electrical power system having a plurality of process units, the program code comprising a set of instructions that, when executed by the computer, cause the computer to perform the operations of:
  receiving data indicating a potential range of attribute values for a first operational attribute and data indicating a potential range of attribute values for a second operational attribute for each of a plurality of process units at each of one or more of a plurality of steam pressure levels, collectively defining interval input data, the potential range of values for the first operational attribute describing supply or generation boundaries for the respective plurality of process units, the potential range of values for the second operational attribute describing demand boundaries for the respective plurality of process units, the respective potential range of first operational attribute values and the potential range of second operational attribute values for each of the plurality of process units each representing boundaries defined by each significantly potential combination of process condition modifications and each significantly potential combination of process disturbances and uncertainty for the respective plurality of process units of the combined steam heat and electrical power system; and
  determining at least one global minimum energy utility target for a first type of utility for import or export along with at least one global energy target for a second type of utility for import or export using a cascade algorithm responsive to the interval input data, the second type of utility being different from the first type of utility, the at least one global minimum energy utility target being global to the collective plurality of process units and being unconstrained by a global electricity target or global steam process or utility target, the operation comprising:
    determining one or more of the following:
      a global minimum steam importation or exportation target along with at least one global electricity importation or exportation target, and
      a global maximum steam importation or exportation target along with at least one global electricity importation or exportation target, and
    applying the potential range of attribute values for the first operational attribute and the potential range of attribute values for the second operational attribute for each of the plurality of process units as input values to the cascade algorithm to thereby determine the at least one global minimum energy utility target, the cascade algorithm employable to determine surplus and deficit steam boundary values between each of the plurality of steam pressure levels and the global minimum steam importation or exportation target and the global maximum steam importation or exportation target, the cascade algorithm cascading surplus steam of each of the plurality of steam pressure levels from a higher steam pressure level to a lower steam pressure level, the global minimum and maximum steam import values determinable from the cascade algorithm and describing range boundaries of steam deficit across the plurality of cascaded steam headers and represented at a highest of the steam pressure levels, the global minimum and maximum steam export values determinable from the cascade algorithm and describing range boundaries of steam surplus across the plurality of cascaded steam headers and represented at a lowest of the steam pressure levels.

43. A non-transitory computer readable medium as defined in claim 42,
  wherein the operation of determining at least one global minimum energy utility target for a first type of utility for import or export along with at least one global energy target for a second type of utility for import or export using the cascade algorithm is performed for each of a plurality of discrete values throughout the potential range of values for the first operational attribute and the respective potential range of values for the second operational attribute of each of the plurality of process units without enumeration.

44. A non-transitory computer readable medium as defined in claim 42, wherein the operations further comprise:
  determining a global minimum energy utility target for the first type of utility subject to a desired global maximum energy utility target for the second different type of utility.

45. A non-transitory computer readable medium as defined in claim 42, wherein the operations further comprise:
  determining substantially discrete supply and demand conditions for each of the plurality of process units that render the at least one global minimum energy utility target for the first type of utility and the at least one global energy target for the second type of utility.

46. A non-transitory computer readable medium as defined in claim 45, wherein the operation of determining substantially discrete supply and demand conditions for each of the plurality of process units that render the at least one global minimum energy utility target for the first type of utility and the at least one global energy target for the second type of utility is performed for the first type of utility subject to at least one other desired global energy utility target objective for the second different type of utility.

47. A non-transitory computer readable medium as defined in claim 42, wherein the operation of determining at least one global minimum energy utility target for a first type of utility along with at least one global energy target for a second type of utility using a cascade algorithm includes determining a global minimum steam importation requirement and a global minimum steam exportation capability, along with an associated global minimum electricity cogeneration capability responsive to application of an intervals collapsing algorithm.

48. A non-transitory computer readable medium comprising a program code for optimizing energy management for a site including a combined steam heat and electrical power system having a plurality of process units, the program code comprising a set of instructions that when executed by a computer, cause the computer to perform the operations of:
  receiving data indicating a potential range of steam supply values and data indicating a potential range of steam demand values for each of a plurality of process units, collectively defining input data; and
  determining at least one global steam target along with at least one global electricity target using a cascade algorithm and responsive to the input data,
  wherein the operation of determining the at least one global steam target along with at least one global electricity target using the cascade algorithm including the operation of applying the potential range of steam supply values and the potential range of steam demand values of each of the plurality of process units to the cascade algorithm;
  wherein the at least one global steam target comprises both a global minimum steam importation requirement and a global maximum steam importation requirement; and
  wherein the global minimum steam importation requirement and global maximum steam importation requirement form a steam importation interval (STI) determined according to the following calculation:

$STI = [STI(\text{minimum}), STI(\text{maximum})]$;

wherein:
  $STI(\text{minimum}) = \text{ABS Min}\{\text{Min}[ST_S^{high\_output}], 0.0\}$,
  $STI(\text{maximum}) = \text{ABS Min}\{\text{Min}[ST_S^{low\_output}], 0.0\}$,
  $S = 1, 2, \ldots, N$,
  N is a total number of steam headers,
  D is a total number of dummy headers,
  N+D is a total number of pressure steps, and
  ABS is the absolute of the value between brackets;

wherein:

$$ST_s^{high\_output} = ST_{s-1}^{high\_output} + ST_s^{high\_Surplus},$$

$$ST_s^{low\_output} = ST_{s-1}^{low\_output} + ST_s^{low\_Surplus},$$

$$ST_s^{high\_surplus} = \left(\sum_{k=1}^{n_S} STs_k^{high} - \sum_{j=1}^{m_S} = STd_j^{low}\right), \text{ and}$$

$$ST_s^{low\_surplus} = \left(\sum_{k=1}^{n_S} STs_k^{low} - \sum_{j=1}^{m_S} = STd_j^{high}\right);$$

wherein:
  $n_S$ is the number of steam supply sources,
  $m_S$ is the number of steam demand sinks represented in the $S^{th}$ pressure step,
  $ST_0^{high\_output} = 0.0$, and
  $ST_0^{low\_output} = 0.0$; and
wherein:
  $ST_s^{low}{}_k$: is the low value of a steam supply flowrate term,
  $ST_s^{high}{}_k$: is the high value of the steam supply flowrate term,
  $ST_d^{low}{}_j$: is the low value of a steam demand flowrate term, and
  $ST_d^{high}{}_j$: is the high value of the steam demand flowrate term.

49. A non-transitory computer readable medium as defined in claim 48,
  wherein the at least one global steam target comprises both a global minimum steam exportation capability and a global maximum steam exportation capability, the global minimum steam exportation capability being collectively defined by one or more of the following: global minimum steam export, vent, and condensation, the global maximum steam exportation capability being collectively defined by one or more of the following: a global maximum steam export, vent, and condensation; and
  wherein the global minimum steam exportation capability and global maximum steam exportation capability form a steam exportation interval (STE) determined according to the following calculation:

$STE = [STE(\text{minimum}), STE(\text{maximum})]$;

wherein:
  $STE(\text{minimum}) = \text{ABS Min}\{\text{Min}[ST_S^{high\_output}], 0.0\}$, and
  $STE(\text{maximum}) = \text{ABS Min}\{\text{Min}[ST_S^{low\_output}], 0.0\}$;
wherein:
  $ST_0^{low\_output} = ZSTI(\text{maximum})$,
  $ST_0^{high\_output} = ZSTI(\text{minimum})$,
  $ZSTI(\text{minimum}) = \text{ABS Min}\{\text{Min}[ST_S^{high\_output}], 0.0\}$, and
  $ZSTI(\text{maximum}) = \text{ABS Min}\{\text{Min}[ST_S^{low-output}], 0.0\}$; and
wherein:

$$ST_s^{high\_output} = ST_{s-1}^{high\_output} + ST_s^{high\_Surplus},$$

$$ST_s^{low\_output} = ST_{s-1}^{low\_output} + ST_s^{low\_Surplus},$$

$$ST_s^{high\_surplus} = \left(\sum_{k=1}^{n_S} STs_k^{high} - \sum_{j=1}^{m_S} = STd_j^{low}\right), \text{ and}$$

-continued $$ST_s^{low\_surplus} = \left(\sum_{k=1}^{n_s} STs_k^{low} - \sum_{j=1}^{m_s} = STd_j^{high}\right).$$

50. A non-transitory computer readable medium as defined in claim 48,
   wherein the at least one global electricity target comprises both a global minimum electricity cogeneration capability and a global maximum electricity cogeneration capability; and
   wherein the global minimum electricity cogeneration capability and global maximum electricity cogeneration capability form an electricity cogeneration interval (ECOGEN) determined according to the following calculation:

ECOGEN=[(ECOGEN_low), (ECOGEN_high)];

wherein:

$$(\text{ECOGEN\_low}) = \sum_{s=1}^{N+D} (\text{ECOGEN\_low})s, \text{ and}$$

$$(\text{ECOGEN\_high}) = \sum_{s=1}^{N+D} (\text{ECOGEN\_high})s;$$

wherein:
   $(\text{ECOGEN\_low})_s = ST_S^{low\_output} * (\text{Efficiency\_low}) * (H_{s-1} - H_s)$, and
   $(\text{ECOGEN\_High})_s = ST_S^{high\_output} * (\text{Efficiency\_high}) * (H_{s-1} - H_s)$; and wherein:
   $(H_{s-1} - H_s)$ is a specific enthalpy difference between upper pressure and lower pressure steps,
   (Efficiency_low) is an arbitrary lower bound number for electricity generation efficiency, and
   (Efficiency_high) is an arbitrary upper bound number for electricity generation efficiency.

* * * * *